United States Patent
Dufner et al.

(10) Patent No.: US 7,230,400 B1
(45) Date of Patent: Jun. 12, 2007

(54) ELECTRONICALLY COMMUTATED MOTOR

(75) Inventors: Thomas Dufner, Schonach (DE); Jörg Hornberger, Dornstetten (DE); Frank Jeske, St. Georgen (DE); Hermann Rappenecker, Vöhrenbach (DE); Arno Karwath, Rottweil (DE)

(73) Assignee: EBM-PAPST St. Georgen GmbH & Co. KG, St. Georgen (DE)

( * ) Notice: Subject to any disclaimer, the term of this patent is extended or adjusted under 35 U.S.C. 154(b) by 0 days.

(21) Appl. No.: 09/806,619

(22) PCT Filed: Jul. 23, 1999

(86) PCT No.: PCT/EP99/05282

§ 371 (c)(1),
(2), (4) Date: Mar. 28, 2001

(87) PCT Pub. No.: WO00/21189

PCT Pub. Date: Apr. 13, 2000

(30) Foreign Application Priority Data

Oct. 5, 1998 (DE) ................................ 198 45 626

(51) Int. Cl.
*H02P 6/00* (2006.01)
(52) U.S. Cl. ........................ 318/439; 318/254
(58) Field of Classification Search ............... 318/254, 318/652, 439; 700/71, 56; 388/800, 801; 310/68 R, 68 B
See application file for complete search history.

(56) References Cited

U.S. PATENT DOCUMENTS

| | | | |
|---|---|---|---|
| 3,873,897 A | 3/1975 | Müller | 318/138 |
| 4,513,079 A * | 4/1985 | Sakanoue et al. | 430/502 |
| 4,531,079 A * | 7/1985 | Muller | 318/254 |
| 4,680,515 A * | 7/1987 | Crook | 318/254 |
| 4,743,815 A | 5/1988 | Gee | 318/254 |
| 4,748,386 A * | 5/1988 | Nakanishi et al. | 318/254 |
| 4,926,099 A * | 5/1990 | Ricker et al. | 318/254 |
| 5,270,622 A * | 12/1993 | Krause | 318/254 |
| 5,285,135 A | 2/1994 | Carbolante | 318/254 |
| 5,298,839 A | 3/1994 | Takeda | 318/254 |
| 5,334,917 A | 8/1994 | Lind | 318/254 |
| 5,341,452 A * | 8/1994 | Ensor | 388/811 |
| 5,350,988 A * | 9/1994 | Le | 318/618 |

(Continued)

FOREIGN PATENT DOCUMENTS

EP 0 505 159 B1 11/1996

OTHER PUBLICATIONS

Derwent WPI English abstract of DE 23 46 380-A & FR-2 244 290, PAPST-MOTOREN, publ. May 1975, corresponding to USP 3,873,897.
Derwent WPI English abstract of DE 44 41 372-A, publ. Jun. 1995, corresp. to USP 5,845,045.

(Continued)

*Primary Examiner*—Jungwon Chang
(74) *Attorney, Agent, or Firm*—Milton Oliver, Esq.; Ware Fressola Van Der Sluys & Adolphson LLP

(57) ABSTRACT

In an electronically commutated motor (M), rotor position signals are generated by means of a galvanomagnetic rotor position sensor (40). A timer (CNT_HL) brings about an advanced commutation which occurs only once the motor has reached a specific rotation speed, and whose magnitude is a function of the rotation speed.

30 Claims, 24 Drawing Sheets

U.S. PATENT DOCUMENTS

| | | | | |
|---|---|---|---|---|
| 5,428,276 A | | 6/1995 | Carbolante | 318/254 |
| 5,486,743 A | | 1/1996 | Nagai | 318/439 |
| 5,534,763 A | * | 7/1996 | Williams et al. | 318/799 |
| 5,583,404 A | | 12/1996 | Karwath | 318/254 |
| 5,590,235 A | | 12/1996 | Rappenecker | 388/803 |
| 5,717,297 A | | 2/1998 | Karwath | 318/254 |
| 5,831,359 A | * | 11/1998 | Jeske | 310/68 B |
| 5,845,045 A | | 12/1998 | Jeske | 388/804 |
| 5,847,523 A | | 12/1998 | Rappenecker | 318/434 |
| 5,936,370 A | * | 8/1999 | Fukao et al. | 318/652 |
| 6,078,152 A | | 6/2000 | Dieterle | 318/264 |
| 6,104,113 A | * | 8/2000 | Beifus | 310/68 B |
| 6,107,763 A | * | 8/2000 | Rossi | 318/254 |
| 6,414,408 B1 | * | 7/2002 | Erdman et al. | 310/68 R |
| 6,768,279 B1 | * | 7/2004 | Skinner et al. | 318/254 |

OTHER PUBLICATIONS

Atmel Corp., datasheet on AT24C01A 2-wire Serial EEPROM, pp. 1-16 (San Jose, CA, 2000).

National Semiconductor, datasheet on COP842CJ 8-bit microcontroller, pp. 1-36 (Jan. 2000).

* cited by examiner

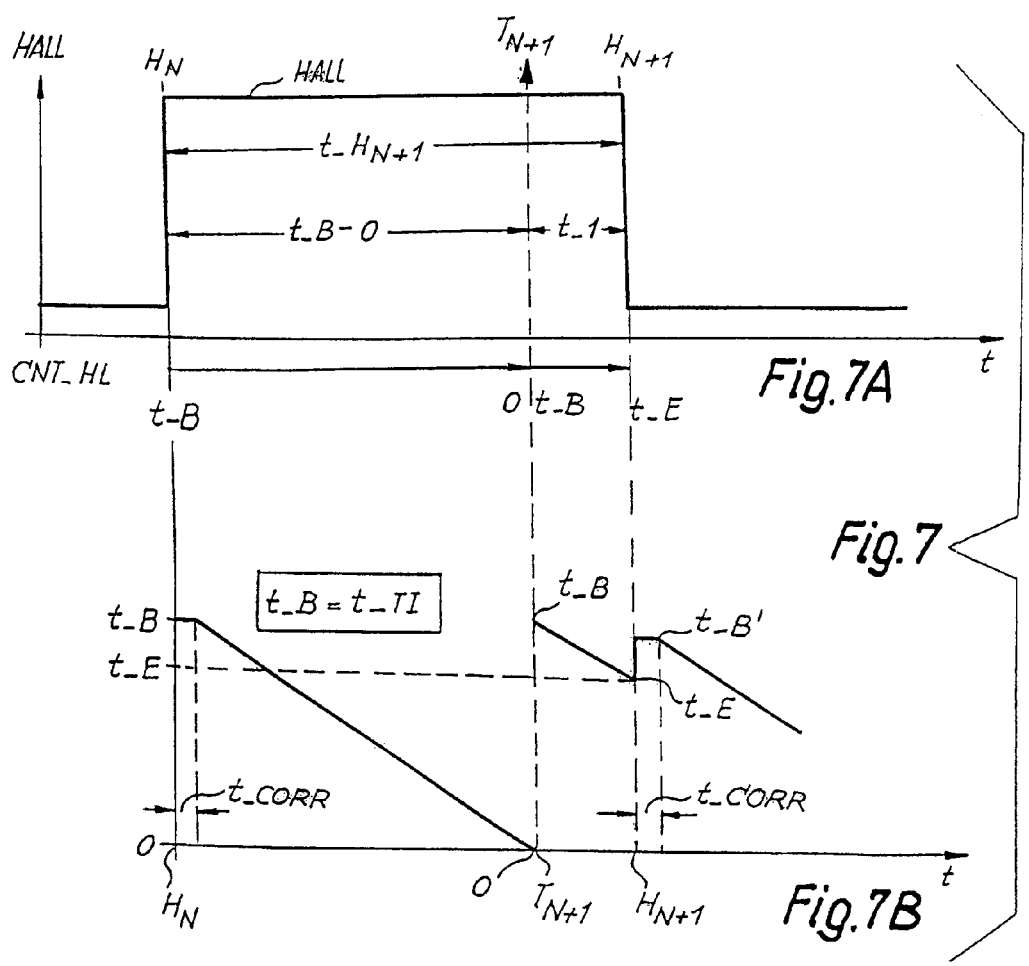

ELECTRONICALLY COMMUTATED MOTOR

BACKGROUND

Field of the Invention

The invention concerns an electronically commutated motor, and in particular an electronically commutated motor with an "ignition advance angle." This is understood to mean that commutation is shifted to an earlier point in time, usually as a function of rotation speed. Of course nothing is "ignited" in an electric motor, but this term (borrowed from automotive engineering) is often used for its descriptive value, as is the phrase "ignition angle shifting." This term will therefore be used hereinafter even though it is scientifically not entirely correct.

Electronically commutated motors with an ignition advance angle are known, for example, from DE-A 197 00 479.2 and corresponding U.S. Pat. No. 6,078,152. Here the commutation accuracy is insufficient for many situations, and the program must execute in accordance with a fixed time pattern; this is complex, and in many cases does not sufficiently utilize the computing performance of a processor. The commutation operations can also fluctuate somewhat in time, which increases the noise of such a motor.

SUMMARY OF THE INVENTION

It is therefore an object of the invention to make available a new electronically commutated motor and a method for operating such a motor.

According to a first aspect of the invention, this object is achieved by an electronically commutated motor wherein the time at which a motor control interrupt routine is triggered varies as a function of current rotation speed of the motor. A motor of this kind operates with better efficiency, especially at higher rotation speeds, because commutation can be advanced more and more as the rotation speed increases. The use of an interrupt routine results in precisely timed control of the commutation operation, and thus in a quiet-running motor.

The stated object is achieved in another way by a method according to the present invention wherein a second time interval is subtracted, during the calculation, from a time variable which is substantially inversely proportional to the rotation speed of the motor. By also measuring a second time after the first time has elapsed, it is very easy to obtain, by addition of these two times and optionally of a correction factor, a time variable which is substantially inversely proportional to the rotation speed of the motor and which can serve, in a subsequent commutation operation, as an updated time variable for calculating a new numerical value for the first time.

According to a further refinement of the invention, this time variable, inversely proportional to rotation speed, is preferably used for a commutation operation that is located one rotor revolution later than the measurement of the first and second times, because a particularly quiet-running motor is then obtained. If the time variable is measured, for example, in the rotation angle region from 0° to 180° (elec.), one revolution later it can be the basis for controlling a commutation that takes place there approximately in the same angular region from 0° to 180° (elec.).

Also, in particularly preferred fashion, at least one non-time-critical process step is configured as a subroutine which is invoked in the program sequence if processor time is available for it. In contrast to a program with a fixed time pattern, this makes possible optimal use of a processor's resources, since with this procedure the subroutine is executed if the processor has nothing else to do at the time.

BRIEF FIGURE DESCRIPTION

Further details and advantageous developments of the invention are evident from the exemplary embodiments, which are described below and depicted in the drawings and are in no way to be understood as a limitation of the invention. In the drawings:

FIGS. 7A and 7B depict calculation of the Hall length when a timer interrupt is present;

Figure 4:
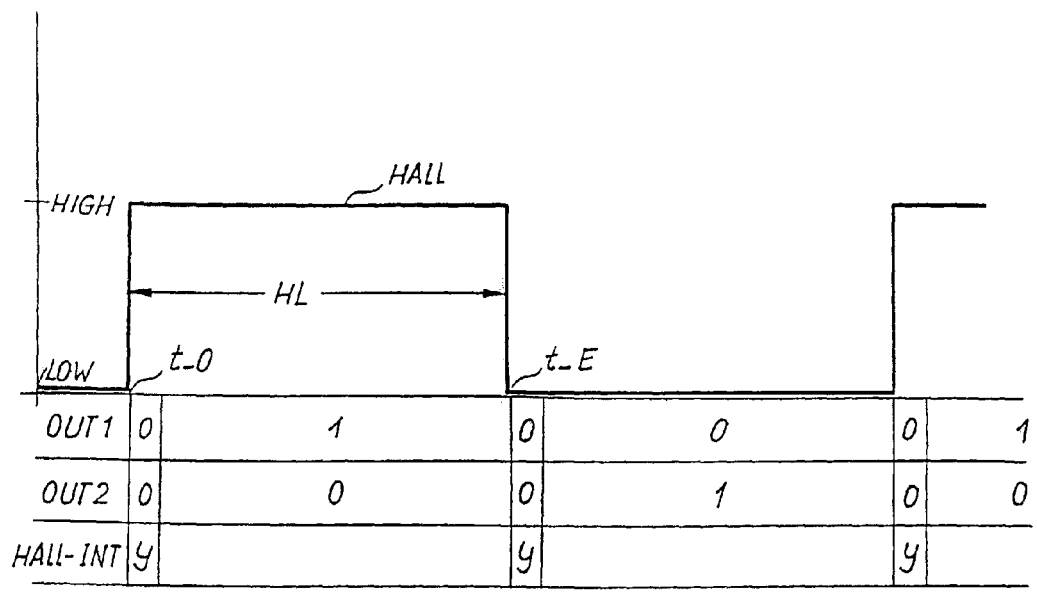
FIG. 4 depicts the Hall signal and a commutation operation with no ignition angle shift.
Figure 9:
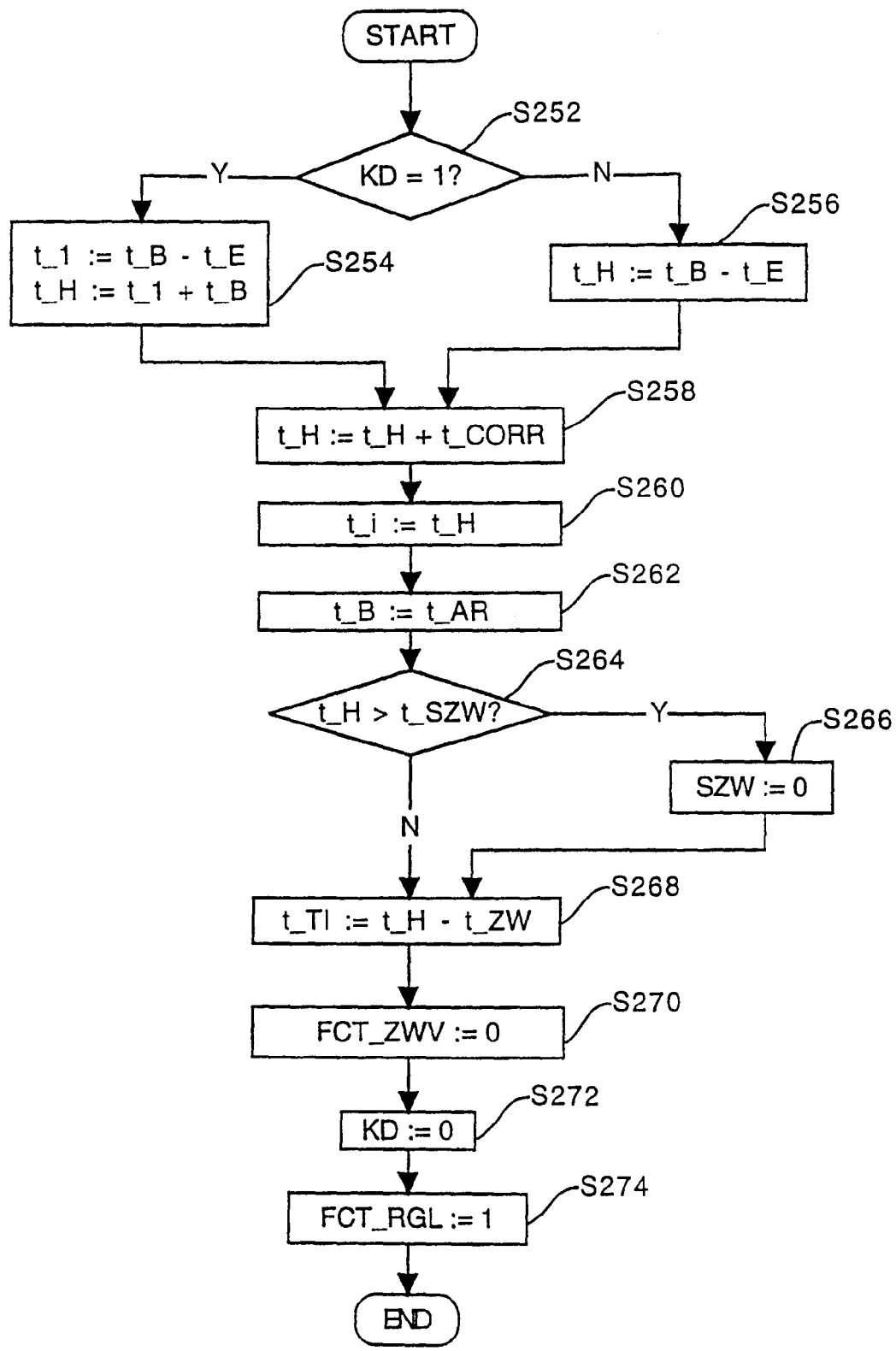
FIG. 9 is a flow chart of an ignition angle calculation routine.
Figure 17:
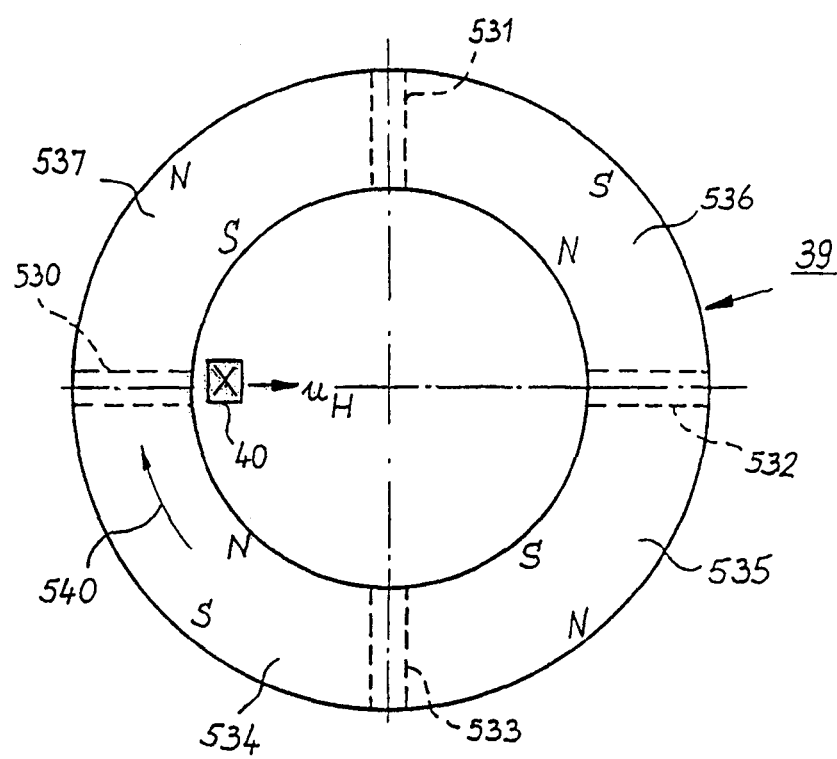
Figure 19:
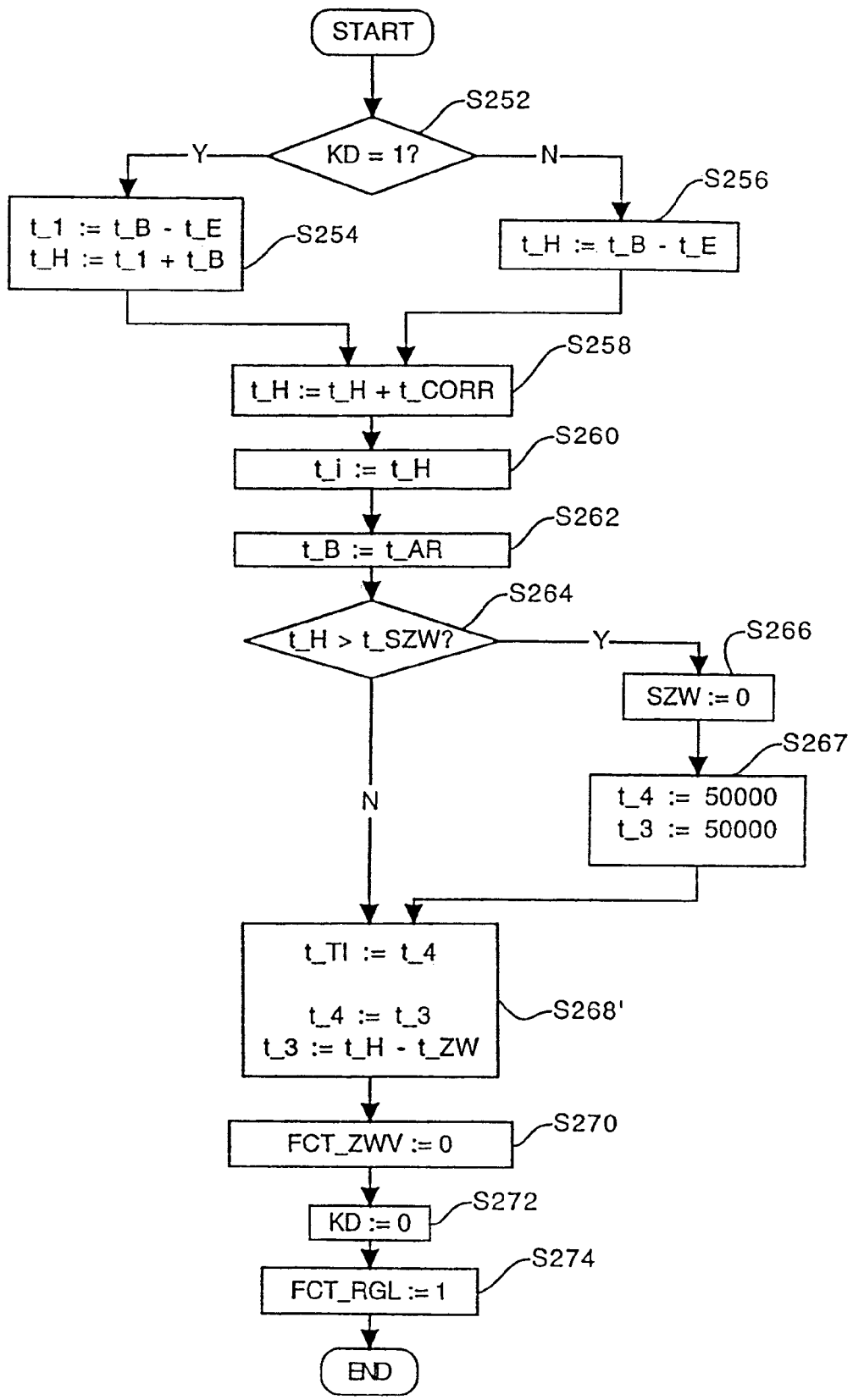
Figure 20:
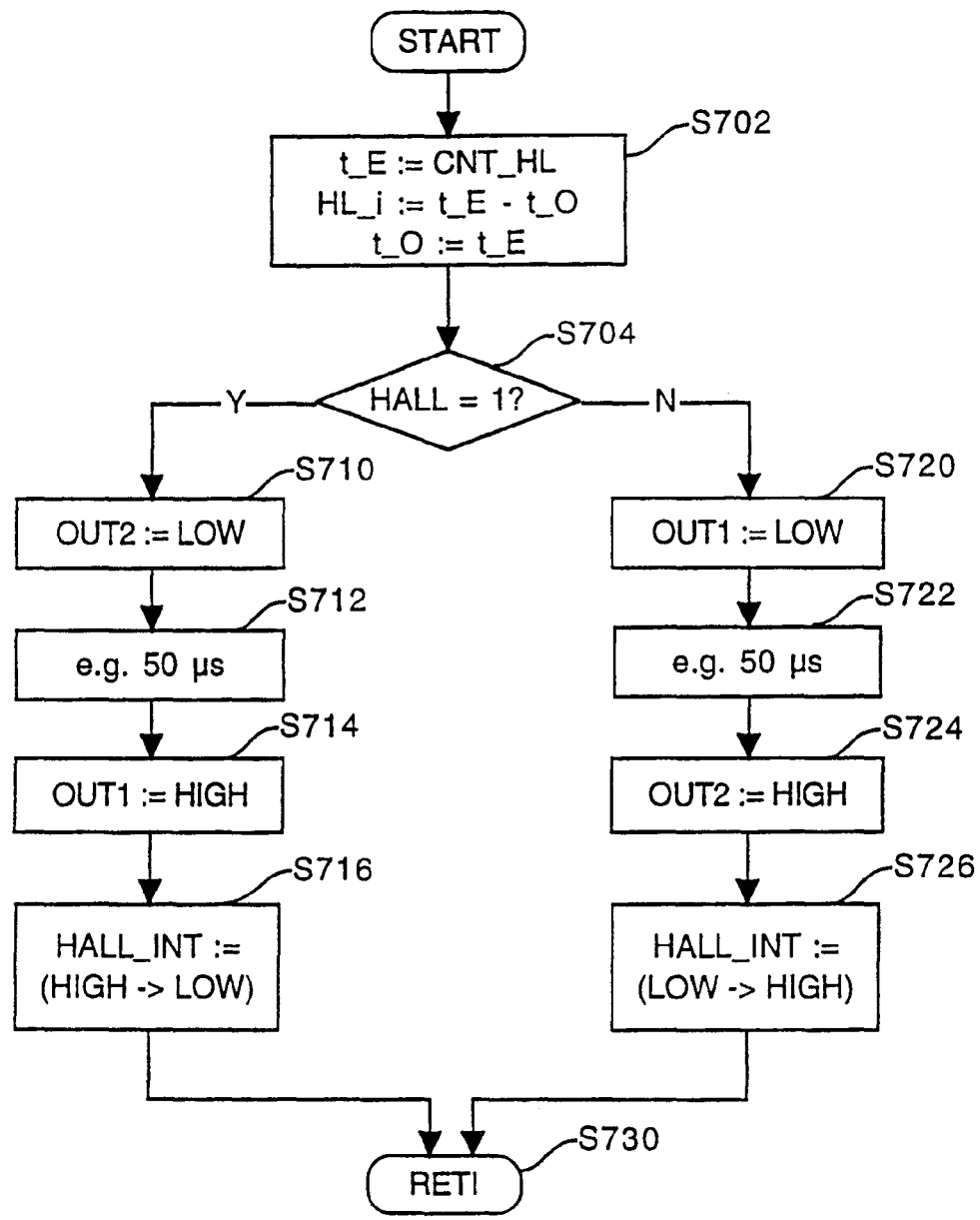
Figure 22:
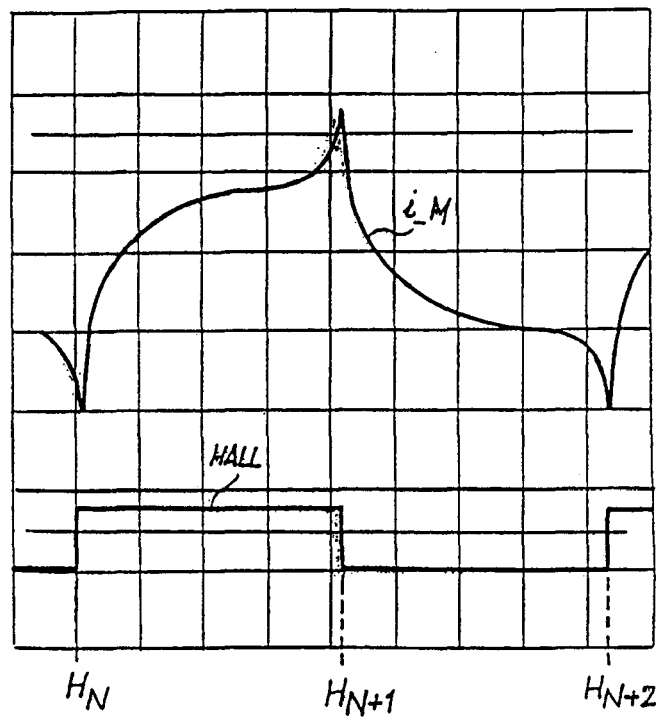
Figure 23:
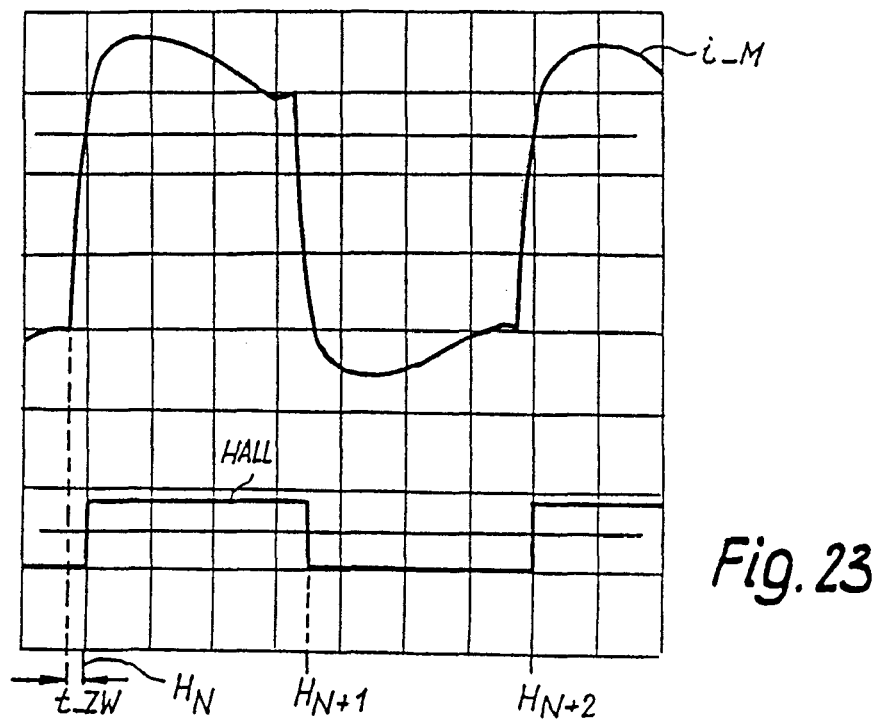

FIG. 17 schematically depicts the permanent magnet of a four-pole external rotor;

FIGS. 18A and 18B are diagrams to explain the effect of errors in the magnetization of the external rotor of FIG. 17;

FIG. 19 is a flow chart for ignition angle calculation, similar to FIG. 9 but in a preferred modified form;

FIG. 20 is a flow chart of a Hall interrupt routine for a commutation operation as depicted in FIG. 4;

FIGS. 21A–21C schematically depicts the commutation sequence for the case in which the commutation instants are electronically advanced;

FIG. 22 shows the change over time in signal HALL and in current i_M in a motor winding when the commutation instant is not advanced; and FIG. 23 shows the change over time in signal HALL and in current i_M in a motor winding when the commutation instant is advanced.

DETAILED DESCRIPTION OF A PREFERRED EMBODIMENT

Figure 1:
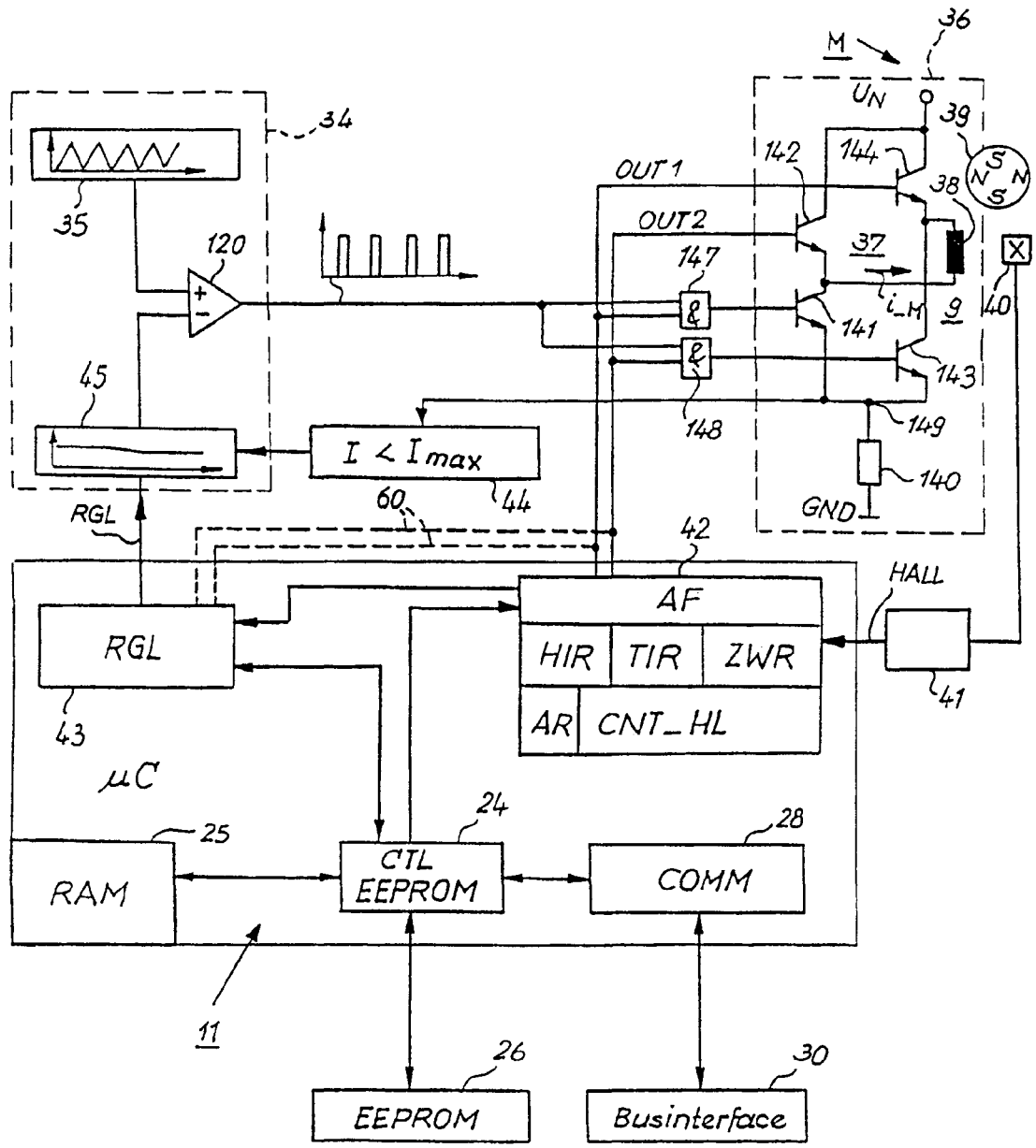
FIG. 1 shows, as an example, an overview of an embodiment of the invention.

FIG. 1 shows an overview of a preferred exemplary embodiment of an electronically commutated motor (ECM) according to the present invention. The latter is controlled by means of a microcontroller (μC) 11, or alternatively a microprocessor. The terminals of µC 11 used in the exemplary embodiment (COP842CJ) available from National Semiconductor Corp. are depicted by way of example in FIG. 2.

The program executed in µC 11 is structured with the aid of a function manager that is described below with reference to FIGS. 15 and 16.

By way of the "CTL EEPROM" function 24, µC 11 has access to a nonvolatile memory (here an EEPROM 26) from which it can load operating parameters into a RAM 25. It can also store operating parameters in RAM 25 and in EEPROM 26. µC 11 can receive and send data by means of a communication function COMM 28 and a bus interface 30. It can use the received data to control the motor, or can store them in RAM 25 or EEPROM 26. EEPROM 26 and bus interface 30 are described with reference to FIG. 14.

An electronically commutated motor M with a single phase 38 is shown in FIG. 1 as a simple example. A motor of this kind is disclosed, for example, in DE 23 46 380 C and corresponding U.S. Pat. No. 3,873,897. This phase 38 is energized by a transistor output stage 36. Outputs OUT1 and OUT2 of µC 11 control npn transistors 141, 142, 143, and 144 which are connected as H-bridge 37. The current through stator winding 38 flows in one direction or the other depending on whether OUT1 is set to HIGH and OUT2 to LOW, or vice versa. The invention is of course similarly suitable for any kind of electronically commutated motor, e.g. for three-phase motors and others. This is therefore only an exemplary embodiment.

Commutation is accomplished electronically. For this purpose, the position of permanent-magnet rotor 39 is sensed via a Hall sensor 40 and an electronic Hall circuit 41 which is shown in more detail in FIG. 3, processed into a signal HALL, and forwarded to a drive function AF 42 which has a Hall interrupt routine HIR (FIG. 8), a timer interrupt routine TIR (FIG. 10), an ignition angle calculation routine ZWR (FIG. 9), and a timer CNT_HL. In the exemplary embodiment, timer CNT_HL is a component of the microcontroller 11 that is used, but it could also be a separate component. Its purpose is to measure times with high precision, and it is controllable via commands of µC 11.

Figure 21:
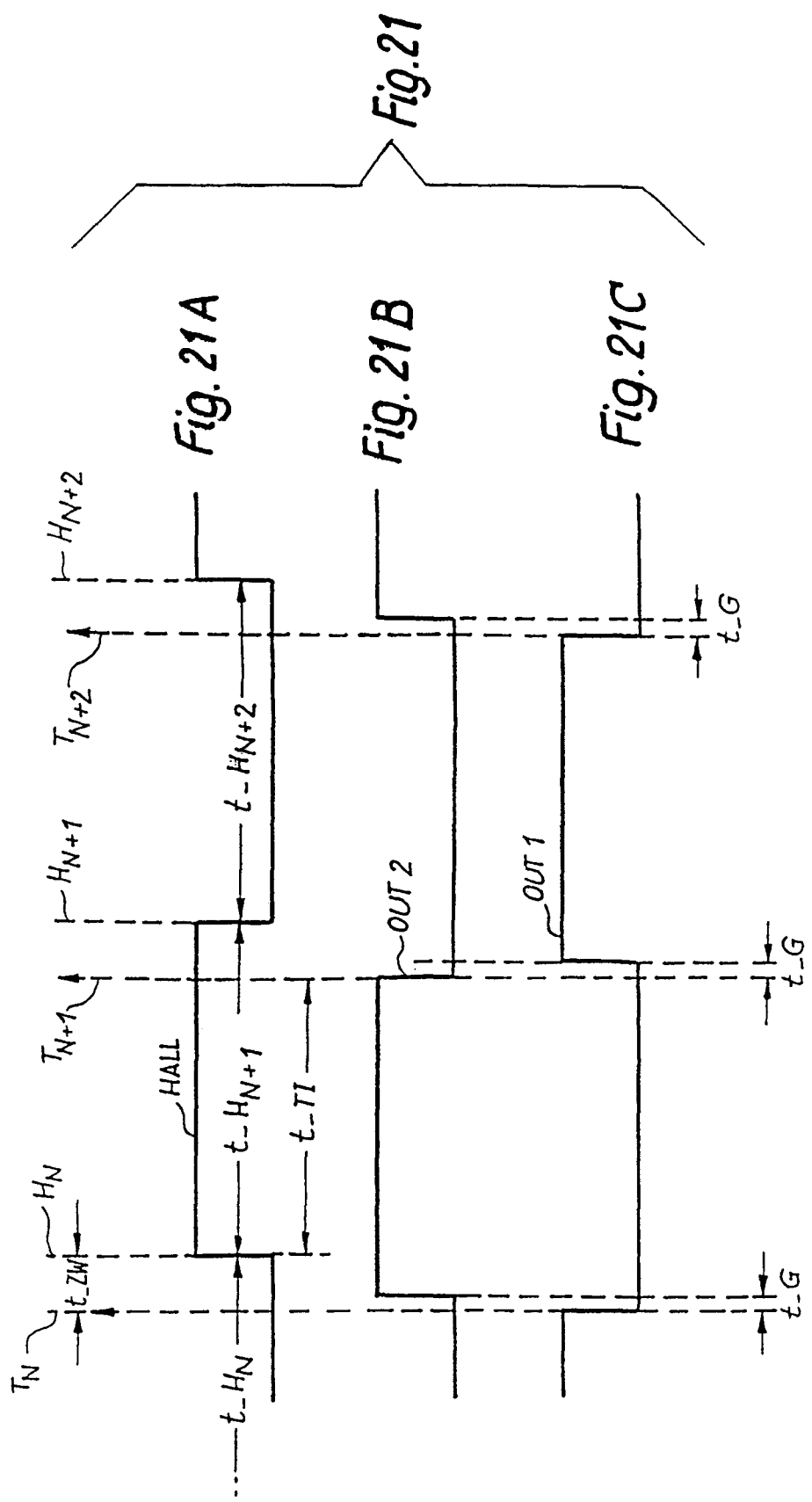

Drive function 42 provides correct commutation of transistor output stage 36 and safe operation, for example, in the event of an overload of transistor output stage 36. Commutation without ignition angle shifting is explained in FIG. 4. Commutation with ignition angle shifting is explained in FIGS. 6 through 12B, and is depicted in FIG. 21.

In the exemplary embodiment, rotation speed controller RGL 42 controls the motor rotation speed. (Motor M can of course also be operated without rotation speed controller 43.) Rotation speed control can be performed, for example, by means of a pulse width modulation (PWM) generator 34, or via a block control system that is schematically indicated at 60 with dashed lines. Regarding the block control system, reference is made, for example, to DE 44 41 372.6 and corresponding U.S. Pat. No. 5,845,045, which discloses an example of a block control system of this kind.

PWM generator 34 has a sawtooth generator 35, a control voltage generator 45, and a comparator 120, and is explained in more detail with reference to FIG. 13. The invention can, of course, also be used in an ECM without rotation speed control.

An "I<$I_{max}$" current limiter 44 reduces the energization of output stage 36 if the current in the single phase 38 becomes too high, for example as the motor is started. Current limiter 44 is described in more detail with reference to FIG. 13.

Preferred values for the electronic components used in the individual Figures of the exemplary embodiment are listed at the end of the specification, and the reader is referred thereto.

Figure 2:
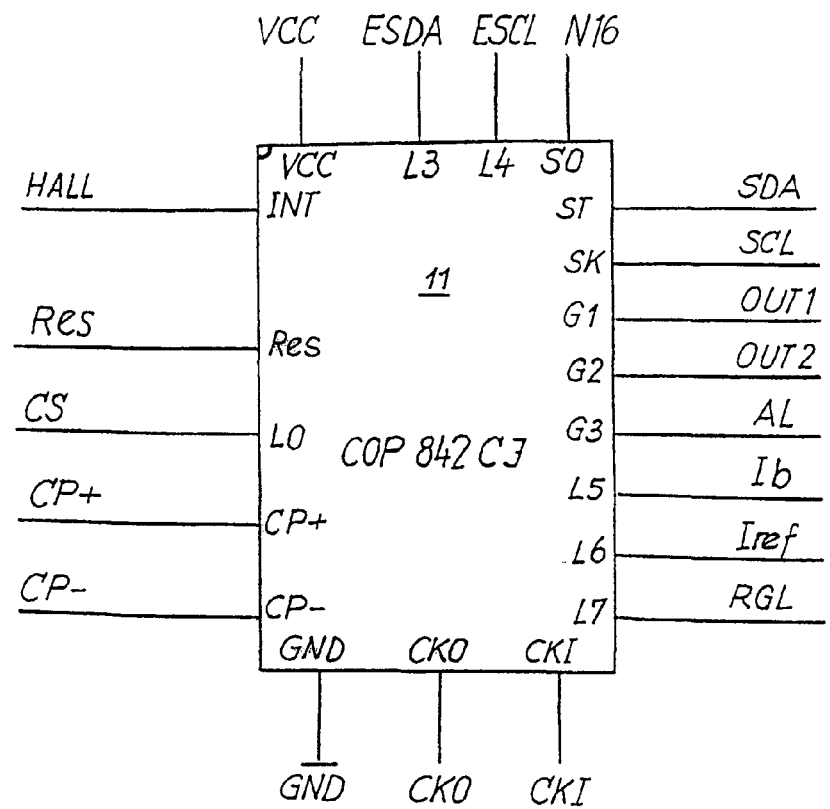
FIG. 2 shows the pin assignment of the COP842CJ microcomputer.

FIG. 2 shows the pin assignment of microcontroller (µC) 11 (model COP842CJ of National Semiconductor) used in the exemplary embodiment. The labeling inside µC 11 corresponds to the manufacturer's labeling; the external labeling of the respective lines shows the designations used principally in the application. A black quarter-circle is drawn at the top left for position identification, and appears also in the subsequent figures.

Figure 3:
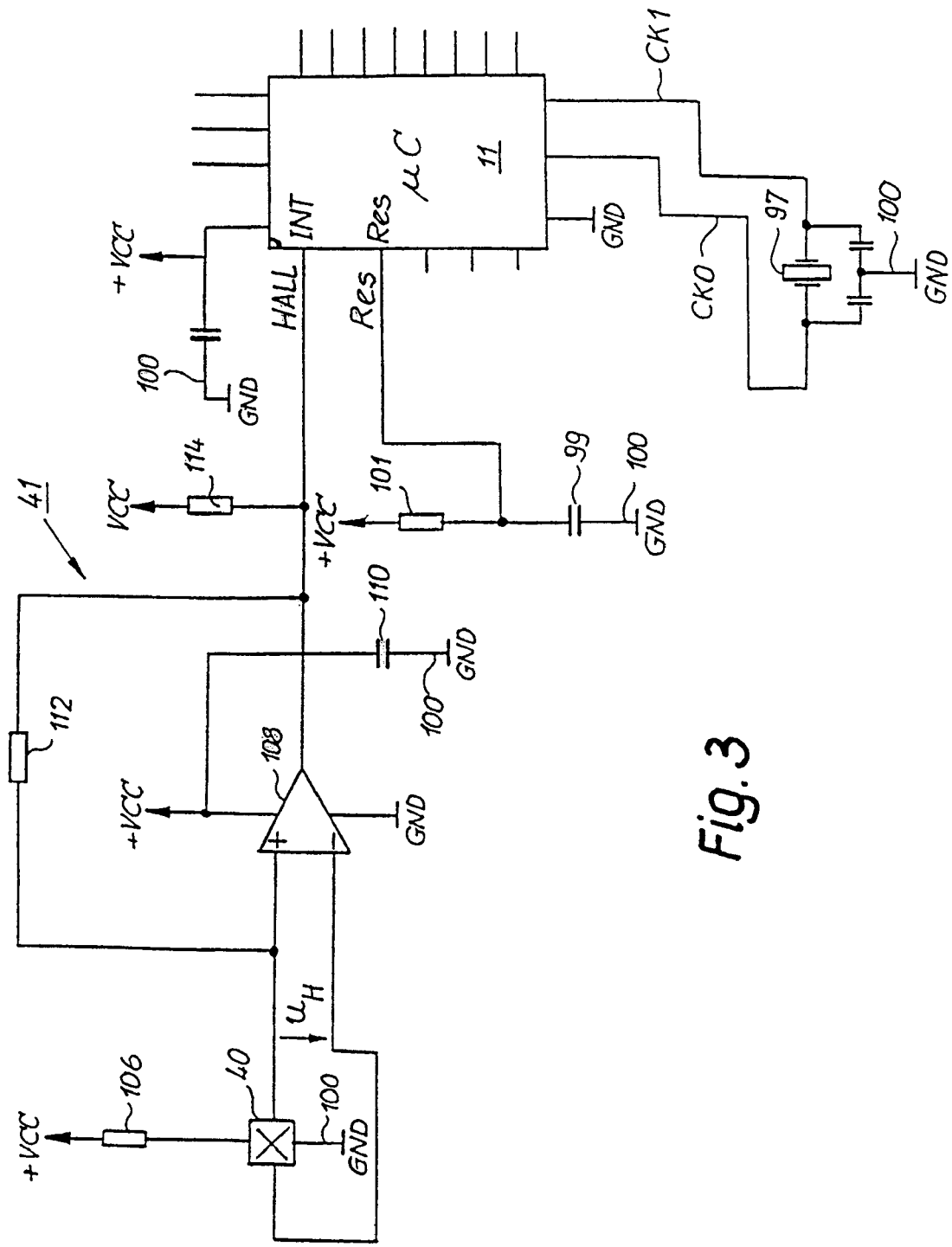
FIG. 3 is a circuit diagram showing the components for processing the Hall signal.

FIG. 3 shows a detailed circuit diagram of the components for Hall circuit 41 which processes the signal of Hall sensor 40, the wiring of clock inputs CK0 and CK1, and the wiring of reset input RES. The other components are not shown in FIG. 3.

An oscillator crystal 97, which is connected to terminals CK0 and CK1 (cf. FIG. 3) of µC 11, defines the latter's clock frequency, e.g. 10 MHz. Reset input Res (FIG. 3) is connected via a capacitor 99 to ground 100 and via a resistor 101 to +Vcc. These two components generate a reset upon power-up in the usual way.

Hall generator 40 is powered by being connected to ground 100 and, via a resistor 106, to +Vcc. Its output signal $u_H$ is conveyed to the two inputs of a comparator 108 whose input Vcc has a filter capacitor 110 associated with it. The output of comparator 108 is connected via a feedback resistor 112 to the positive input of comparator 108, and via a so-called pull-up resistor 114 to +Voc. The output of comparator 108 is also connected directly to port Hall (FIG. 3) of µC 11 so that a rectangular signal HALL, controlled by rotor magnet 39 (FIG. 2), is obtained there.

THE SIGNAL OF HALL SENSOR 40, AND COMMUTATION

FIG. 4 shows a diagram with signal HALL (FIG. 3) and the associated commutation that occurs in the case in which "ignition angle shifting" is not used, i.e. commutation is controlled directly by signal HALL.

In its idealized form, signal HALL has a value HALL=0 during one rotor rotation of 180° (elec.) and a value HALL=1 during the subsequent rotation of 180° (elec.). Each change from HALL=1 to HALL=0 or vice versa brings about an interrupt operation in µC 11, indicated in FIG. 4 by a Y in the row labeled "HALL INT."

The time between two Hall changes, e.g. between instants t_O and t_E, is hereinafter called the Hall length HL or Hall time t_H, and is plotted in FIG. 4 as the true Hall length HL. The Hall length is an indication of the rotation speed of the motor. The shorter it is, the greater the rotation speed of rotor 39 (FIG. 1). (A "true value" is the present value measured at the motor.)

In this example, energization of the stator windings is controlled by output signals OUT1 and OUT2 of µC 11 (FIGS. 1 and 2), which are indicated in FIG. 4, for example, for operation at low rotation speeds, and are described in FIG. 21.

When OUT1 is at 1 (HIGH) and OUT2 at 0 (LOW), current then flows (FIG. 1) from positive voltage $U_N$ through transistor 144, stator winding 38, transistor 141, and measurement resistor 140 to ground.

If OUT1 is at 0 and OUT2 at 1, on the other hand, current then flows (FIG. 1) from positive voltage $U_N$ through transistor 142, through stator winding 38 in the opposite direction, through transistor 143 and measurement resistor 140 to ground. Stator winding 38 is then oppositely energized.

If no ignition angle shift is applied, the two values OUT1 and OUT2 are briefly (e.g. for 50 μs) set to zero by μC 11 at the points at which signal HALL changes (i.e. at Hall interrupts Y), so as briefly to inhibit all four transistors 141 through 144 and prevent a short circuit in bridge 37. This is depicted in FIG. 4.

A simple Hall interrupt routine for the commutation operation shown in FIG. 4 is described below with reference to FIG. 20.

RELATIONSHIP BETWEEN ROTATION SPEED AND HALL LENGTH

The Hall length HL is depicted in FIG. 4. Its relationship to the rotation speed n will be demonstrated below. This relationship is a function of the number of poles P of rotor 39.

If the Hall length HL' is measured in seconds, then:

$$HL' = T/P \tag{1}$$

where:
T=duration of one rotor revolution (in seconds) and
P=number of poles of rotor 39.

If the rotation speed n is measured in rpm, then:

$$HL' = 60/(n \times P) \tag{2}$$

where:
n=rotation speed (in rpm) and
P=number of poles of rotor 39.

Since the Hall length HL is denominated in μs in the exemplary embodiment but HL' is denominated in seconds, HL' is renormalized to HL:

$$HL = 1,000,000 \, HL' \tag{3}$$

For P=4, i.e. a four-pole rotor, then:

$$HL = 15,000,000/n \tag{4}$$

Conversely, for P=4:

$$n = 15,000,000/HL \tag{5}$$

where:
n=rotation speed (in rpm) and
HL=Hall length (in μs).

The rotation speed n=2870 min$^{-1}$ corresponds, for example in the case of a four-pole rotor, to a Hall length HL of:

$$HL = 15,000,000/2870 = 5226 \, \mu s$$

The hexadecimal representation (used within the processor) for this is 0x146A. (Hexadecimal numbers are identified by a "0x" prefix.)

IGNITION ANGLE SHIFTING

In the motor shown in FIG. 1, rotor position sensor 40 is arranged in a pole gap of the stator, i.e. at 0° (elec.), and a change in signal HALL is thus generated at 0° (elec.), 180° (elec.), 360° (elec.), etc., as depicted by way of example in FIG. 4. Regarding such an arrangement the reader is referred, for example, to DE-A-197 00 479.2 and correspondingly U.S. Pat. No. 6.078,152, DIETERLE et al. FIG. 1, reference 25.

In fast-running motors, however, it is necessary, in order to optimize performance and efficiency, to perform commu-tation of the current in stator winding 38 prior to the change in the Hall signal, i.e. at a time before t_O in FIG. 4 and also before t_E. This can be referred to as "ignition advance." To achieve this, it would be possible to displace rotor position sensor 40 relative to the stator of motor 39. But since the motor usually needs to run in both directions, and the advance angle needs to increase with increasing rotation speed in both directions, this is not practical.

The ignition angle shift is therefore controlled electronically. The 16-bit timer CNT_HL (FIG. 1), already described, is used for this purpose. At each Hall interrupt Y, timer CNT_HL is loaded with a (previously calculated) initial value t_TI, and then counts down until it reaches a value of 0. Upon reaching zero, timer CNT_HL triggers a so-called timer interrupt in μC 11, and the timer is automatically reloaded with the contents t_AR of a so-called autoreload register AR (also in μC 11) and then restarted (cf. S302 in FIG. 10).

Figure 5:
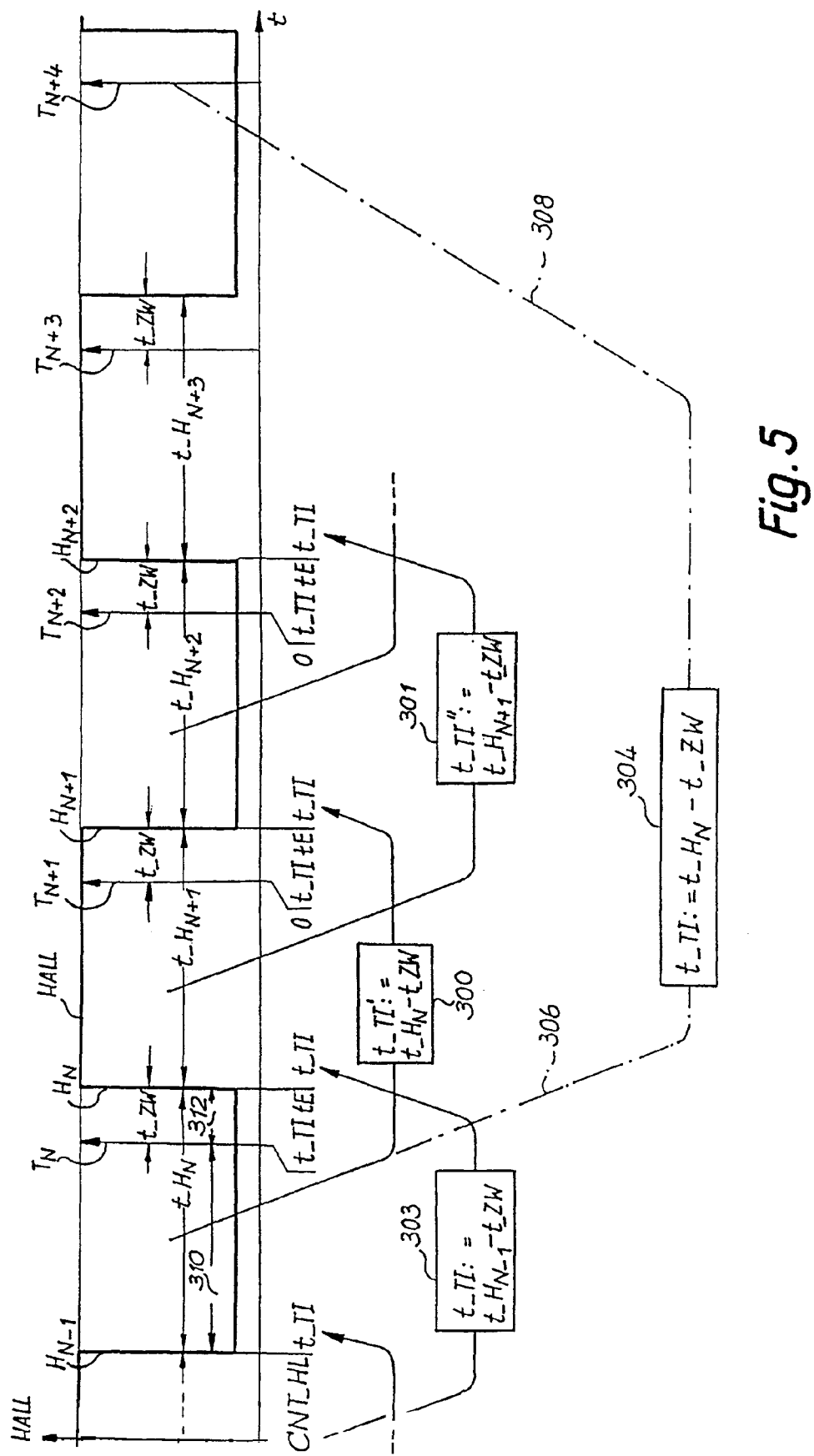
FIG. 5 is a schematic depiction to explain the calculation of an (advanced) commutation instant TN from values that are derived from a signal HALL.

At a Hall interrupt Y, timer CNT_HL is thus set in such a way that it reaches zero (and thereby triggers an interrupt) at the instant at which commutation is to take place. In FIG. 5 this timer interrupt is labeled $T_N$, $T_{N+1}$, etc., and a Hall interrupt is labeled $H_N$, $H_{N+1}$, etc.

The manner in which the timer operates is defined by the microcomputer, containing the timer, that is used. The possibility optionally exists of configuring the timer by way of a register of the microcomputer. Possible configurations relate, for example, to the triggering of an interrupt when zero is reached, or to automatic reloading of the timer when zero is reached.

In addition, timer CNT_HL is used here, very advantageously, to measure the Hall length HL (FIG. 4), which is labeled t_HN in FIG. 5.

FIG. 5 shows the calculation of the timer start value t_TI, depicting signal HALL that is present at the Hall input (FIG. 2) of μC 11, the Hall interrupts $H_{N-1}$, $H_N$, etc., the timer interrupts $T_{N-1}$, $T_N$, etc., and the Hall lengths t_$H_{N-1}$, t_$H_N$, etc. which, in this exemplary embodiment, indicate the time required by the four-pole rotor 39 for one-quarter of a revolution, i.e. for 180° (elec.).

The terms "Hall length HL" and "Hall time t_H" are hereinafter used synonymously. Each Hall time t_$H_{N+1}$ begins after and exclusive of a Hall interrupt $H_N$, and ends with and inclusive of the following Hall interrupt $H_{N+1}$. The Hall interrupts and timer interrupts are numbered on the basis of the Hall time in which they occur. The Hall time t_$H_N$ therefore includes the timer interrupt $T_N$ and (and the end of that time) Hall interrupt $H_N$.

The values of timer CNT_HL are noted below signal HALL in FIG. 5. Timer CNT_HL counts down between the respective values, e.g. from t_TI to 0 in time period 310, and from t_TI to t_E in time period 312.

In this example, the timer start value t_TI for the Hall time t_$H_{N+2}$ is calculated from the Hall length t_$H_N$. To do so, as indicated symbolically at 300, a value t_TI is calculated during the Hall time t_$H_{N-1}$ using the equation $$t\_TI := t\_H_N - t\_ZW \tag{6}$$

i.e. an (in this case constant) ignition angle time t_ZW is subtracted from the Hall length t_$H_N$. The t_TI for the Hall time t_$H_{N+3}$ is similarly calculated from the Hall length t_$H_{N+1}$, as indicated symbolically at 301, and so forth.

Commutation is thus performed in this fashion at instants $T_N$, $T_{N+1}$, $T_{N+2}$, etc. $T_n$ is earlier than $H_N$ by approximately the time t_ZW, i.e. commutation is advanced. Similarly, $T_{N+1}$ is earlier than $H_{N+1}$, etc. The instants $T_N$, $T_{N+1}$, etc. are indicated by upward-pointing arrows.

Figure 18:
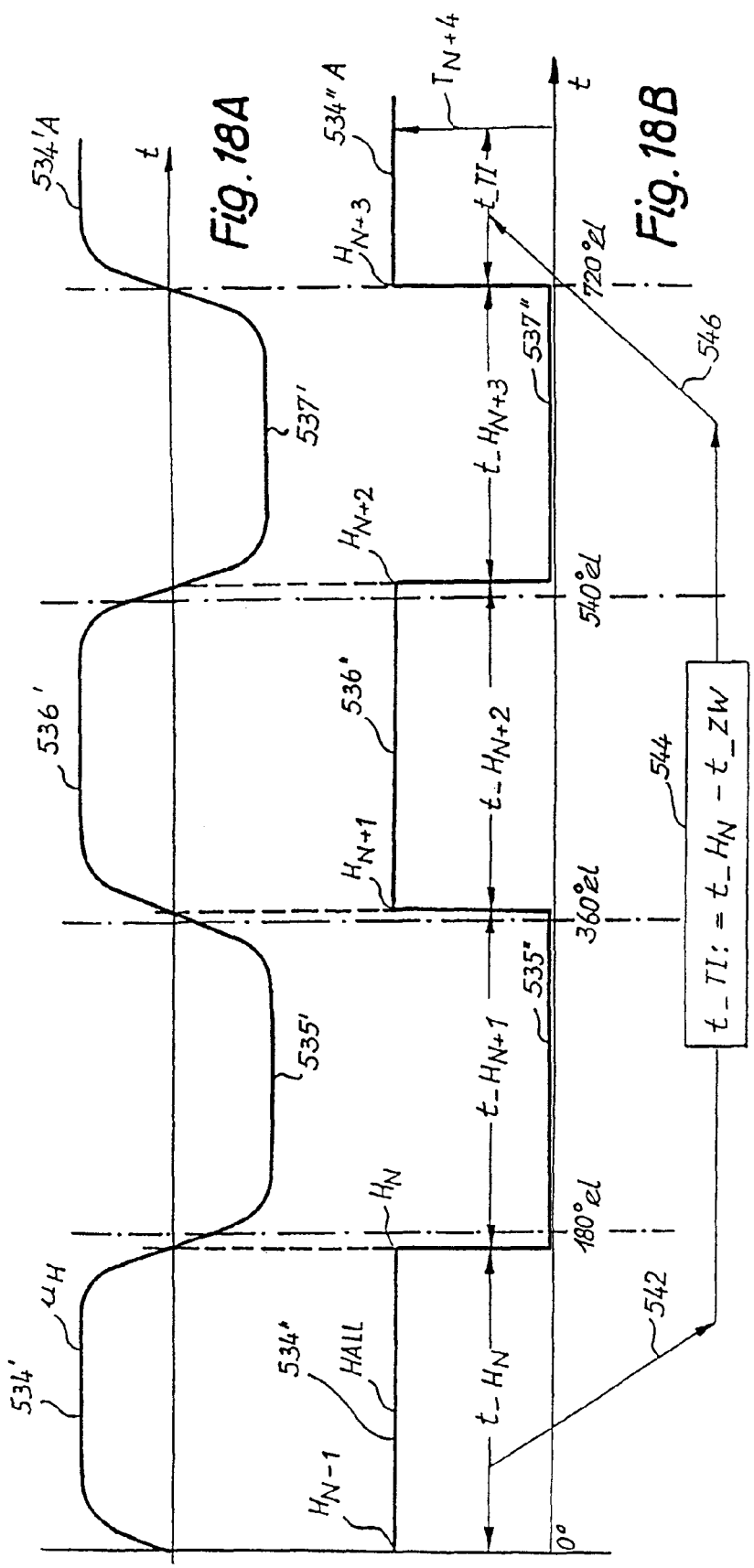

With reference to FIGS. 17 through 19, a description will be given later on of how, in the case of a four-pole rotor 39, the commutation instant $T_{N+4}$, for example, can very advantageously be determined by the previous Hall length t_HN; this results in particularly quiet motor operation. This variant is labeled 304 in FIG. 5, and symbolized by the dot-dash lines 306, 308. With a six-pole rotor, the commutation instant $T_{N+6}$ would analogously be determined by the Hall length t_HN.

Figure 6A:
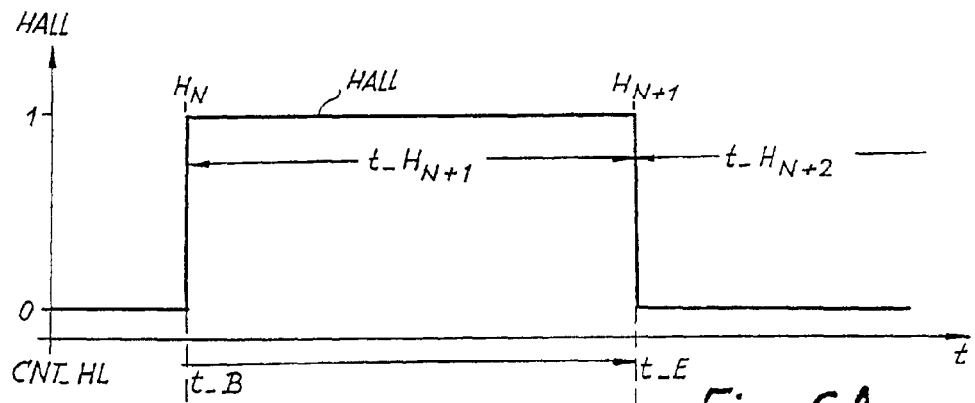
FIGS. 6A and 6B depict calculation of the Hall length when a timer interrupt is not present.

FIGS. 6A/6B and 7A/7B show the two possible cases that can occur when the Hall lengths t_H are measured with timer CNT_HL.

Signal HALL that is present at input Hall (FIG. 2) of µC 11 is shown, along with the Hall interrupts $H_N$ and $H_{N+1}$ and a timer interrupt $T_{N+1}$ (in FIG. 7); on the time axis in FIG. 7A are the start values t_B and stop values t_E of timer CNT_HL that are available for the calculation of the Hall length $t\_H_{N+1}$, which of course is performed only during the following Hall time $t\_H_{N+2}$. t_B corresponds to the (previously calculated) start value t_TI of timer CNT_HL at Hall interrupt $H_N$, and t_E to the stop value of timer CNT_HL at Hall interrupt $H_{N+1}$.

Two situations can occur:

The first situation (FIG. 6) is that the motor accelerates so rapidly that the Hall interrupt $H_{N+1}$ occurs before timer CNT_HL reaches a value of 0. In this case, in the Hall interrupt routine triggered by the Hall interrupt $H_{N+1}$, the stop value of timer CNT_HL is stored in t_E (S202 in FIG. 8A), the motor is commutated, timer CNT_HL and autoreload register AR are reloaded with a value calculated from the Hall length $t\_H_{N-1}$ (FIG. 5), and timer CNT_HL is restarted (S238 in FIG. 8B). In FIG. 6, a timer interrupt $T_{N+1}$ therefore does not occur during the Hall time $t\_H_{N+1}$.

Figure 6B:
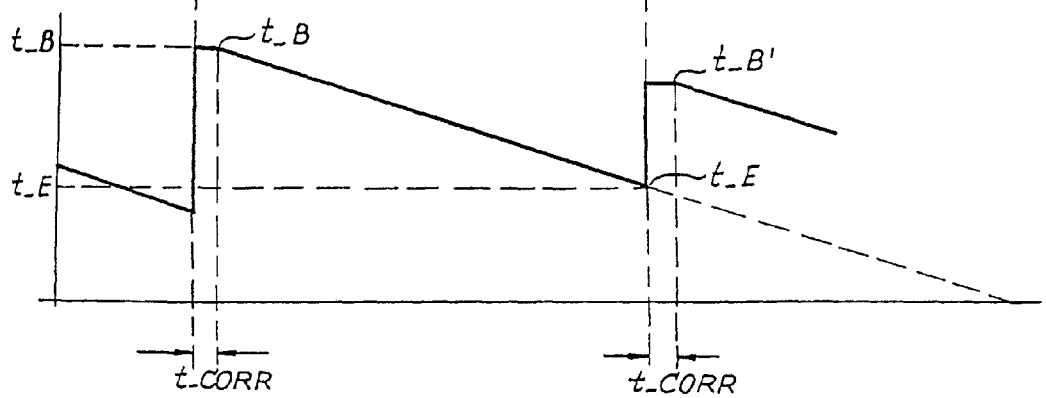

In this situation the Hall length $t\_H_{N+1}$ is calculated using the equation $$t\_H_{N+1} := t\_B - t\_E + t\_CORR \quad (7)$$

where t_CORR is a correction value that is explained in more detail in FIG. 9 with reference to S258 and is depicted in FIG. 6B.

The second situation (FIG. 7A) is that timer CNT_HL reaches zero before the Hall interrupt $H_{N+1}$ occurs. When zero is reached, a timer interrupt $T_{N+1}$ (depicted in FIG. 10) is triggered. At the timer interrupt $T_{N+1}$, timer CNT_HL is automatically reloaded with the value t_AR from autoreload register AR (FIG. 1) and restarted (cf. S302 in FIG. 10). t_B here has the same value as t_TI, and thus also corresponds to t_AR.

This is illustrated by FIG. 7B. In the time period between an instant shortly after $H_N$ and until $T_{N+1}$, timer CNT_HL counts down from t_B to zero, and at a value of zero triggers the timer interrupt $T_{N+1}$. At the beginning of this interrupt, timer CNT_HL is again loaded with t_B (cf. FIG. 10, S302), and then once again counts down during the time until $H_{N+1}$; it does not reach a value of 0, however, but only the value t_E. At the Hall interrupt $H_{N+1}$, timer CNT_HL is again loaded with a (previously calculated) value t_B', and the entire procedure repeats.

Figure 10:
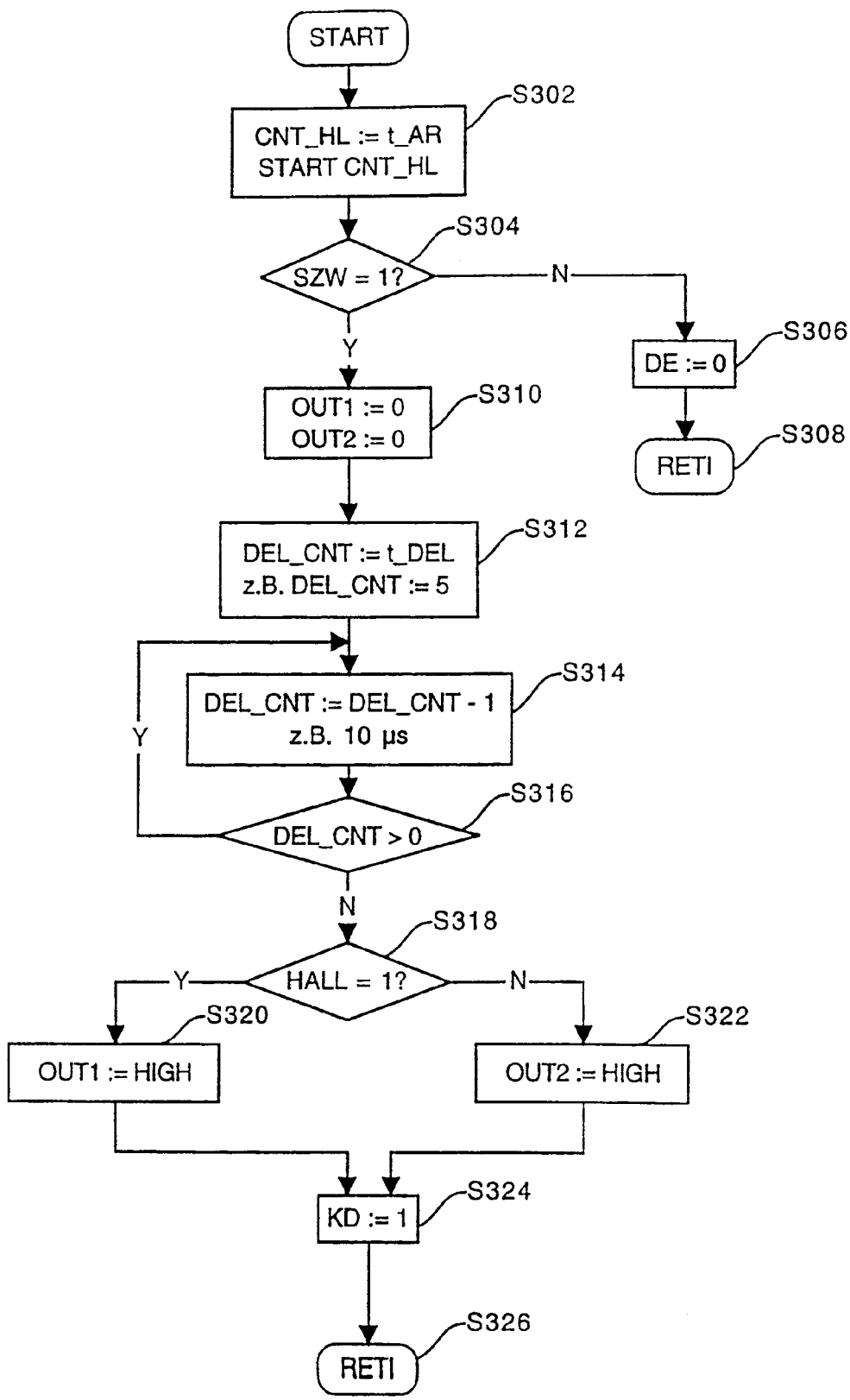
FIG. 10 is a flow diagram of a timer interrupt routine with ignition angle calculation.

In the timer interrupt routine invoked by occurrence of the timer interrupt $T_{N+1}$, commutation is performed if the ignition angle shift function is switched on (cf. FIG. 10, S318, S320, S322), and a flag KD (commutation done) is set to 1 (cf. FIG. 10, S324).

Figure 8A:
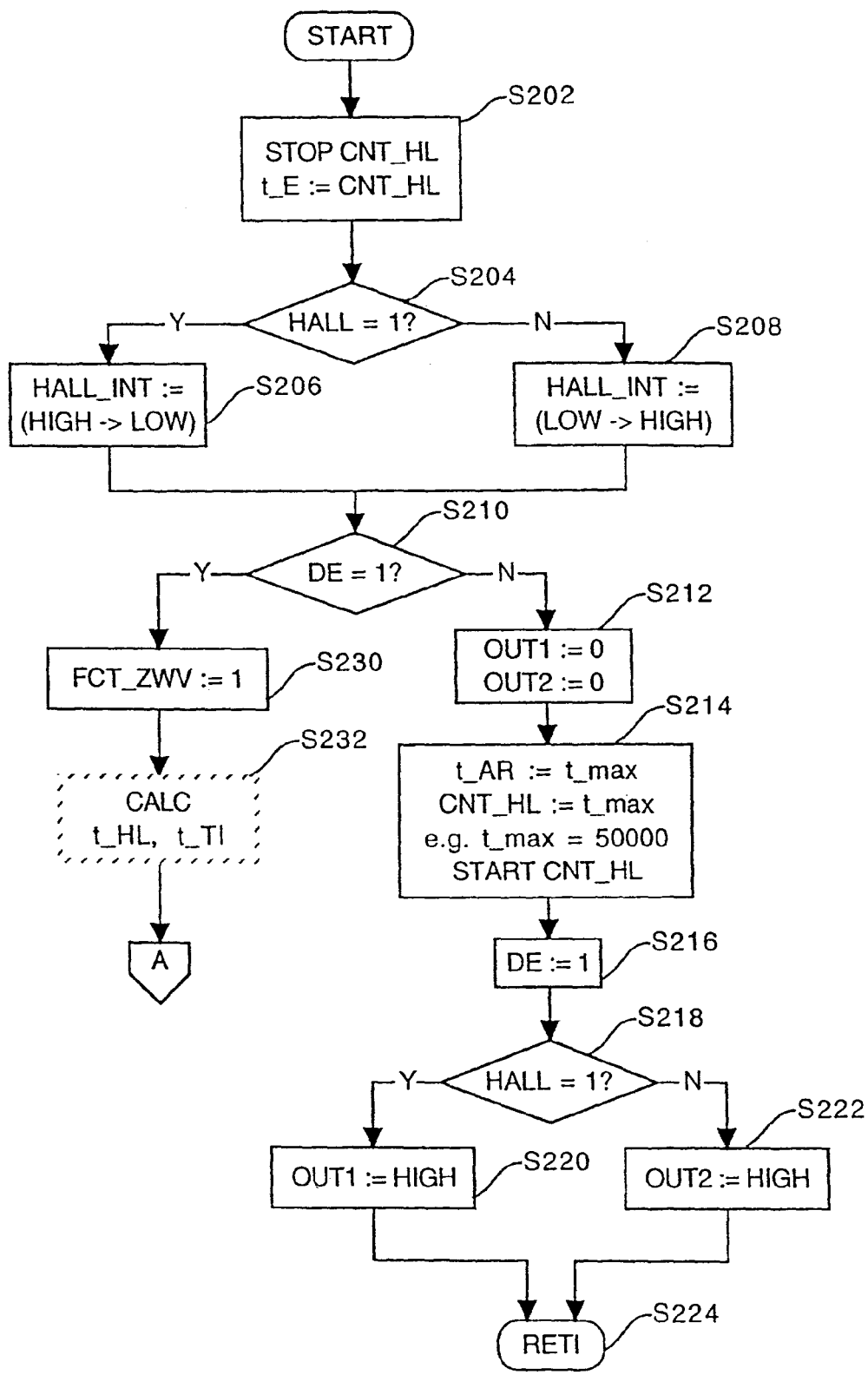
FIGS. 8A and 8B show a flow chart for a Hall interrupt routine with ignition angle shifting.

At the subsequent Hall interrupt $H_{N+1}$, timer CNT_HL is once again stopped and its end time t_E is stored (cf. FIG. 8A, S202). Because the KD flag is set (FIG. 9, S252), the Hall length $t\_H_{N+1}$ (FIG. 7) is calculated as follows in steps S254 and S258 of FIG. 9:

$$t\_1 := t\_B - t\_E \quad (8)$$

$$t\_H_{N+1} := t\_B + t\_1 + t\_CORR \quad (9)$$

where t_1 is the time between the timer interrupt $T_{N+1}$ and the Hall interrupt $H_{N+1}$, as depicted in FIG. 7. The value t_B must be added to the value t_1 for calculation of the Hall length $t\_H_{N+1}$, since between the Hall interrupt $H_N$ and timer interrupt $T_{N+1}$, timer CNT_HL has counted this value down to zero. Also added, if applicable, is a correction value t_CORR which is depicted in FIG. 7B and equals e.g. 40 µs, and is explained in more detail below with reference to FIG. 9, S258. After the Hall interrupt $H_{N+1}$ and a rotation speed calculation (S274 in FIG. 9), flag KD must be reset (KD:=0; cf. S272 in FIG. 9).

QUANTITATIVE EXAMPLE FOR FIG. 7

At $H_N$, timer CNT_HL is set, for example, to a value (previously calculated in step 303 of FIG. 5) t_TI=t_B=9800. t_B thus has a value of 9800 µs for calculation purposes. At $T_{N+1}$, timer CNT_HL has reached a value of zero, causes a timer interrupt, and is once again loaded with 9800 and started (S302 in FIG. 10). At $H_{N+1}$, counter CNT_HL has reached the value t_E=9640. The value t_CORR is assumed to equal 40 µs. Then, using equations (8) and (9):

$$t\_1 := 9800 - 9640 = 160 \, \mu s$$

$$t\_H_{N+1} := 9800 + 160 + 40 = 10,000 \, \mu s$$

In this example the Hall length $t\_H_{N+1}$ is therefore 10,000 µs, corresponding to a rotation speed (equation 5, four-pole rotor) of $$n\_i = 15,000,000/t\_H_{N+1} = 15,000,000/10,000 = 1500 \text{ rpm.}$$

Shortly after $H_{N+1}$, timer CNT_HL then has loaded into it a new value t_B' that corresponds to the (previously calculated) value t_TI' (cf. step 300 in FIG. 5).

Figure 8B:
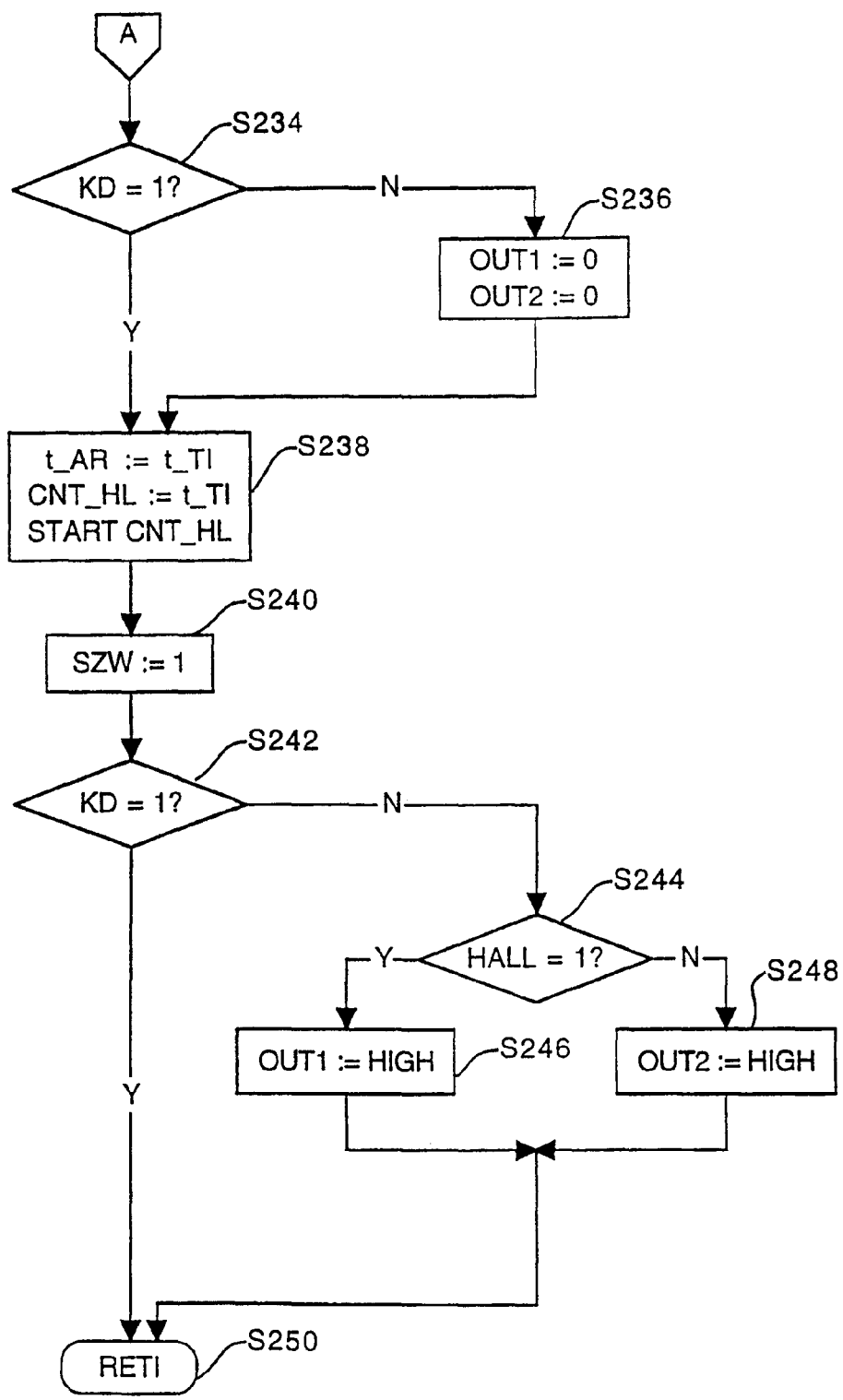

FIGS. 8A and 8B are a flow chart for an exemplary embodiment of a preferred Hall interrupt routine, i.e. a rotor position-dependent interrupt routine. This is triggered when predefined rotor positions are reached, and is responsible for determination of the Hall length $t\_H_N$ and also for commutation, if the latter has not been performed in the timer interrupt routine. All the registers and variables described below in this exemplary embodiment are 16 bits long.

In S202 timer CNT_HL is stopped, and the stop time of timer CNT_HL is stored in t_E.

In the following steps S204–S208, the edge for the next Hall interrupt is set in µC 11. This is done by checking, in S204, whether HALL=1. If so, in S206 the edge at which the next Hall interrupt is to be triggered is set to a trailing edge (HIGH→LOW). Otherwise the edge is set in S208 to a leading edge (LOW→HIGH).

In S210, a distinction is made between two situations on the basis of flag DE (rotation speed reached):

If DE=1, then either a timer interrupt has not occurred, or
    a timer interrupt has occurred and the ignition angle shift function was switched on. As will be explained later, these both indicate that the motor has reached its rotation speed.

If DE=0, then the ignition angle shift function was switched off (SZW=0) and a timer interrupt has occurred. As will be explained later, this indicates that the minimum rotation speed n_min, at which the ignition angle shift function will be switched on, has not yet been reached.

For the situation DE=0, commutation is performed and timer CNT_HL is set to a fixed value t_max (maximum Hall length) which corresponds to the minimum rotation speed n_min. For example, if the minimum rotation speed is 300 rpm, then according to equation (4):

$$t\_max=15,000,00/300=50,000 \ \mu s$$

In S212 this is done by setting OUT1 and OUT2 to zero.

In S214, autoreload register AR and counter CNT_HL are set to t_max (e.g. 50,000). In this example, timer CNT_HL operates at a resolution of 1 μs. Setting CNT_HL to a length of 50,000 μs corresponds to a rotation speed of 300 rpm. Timer CNT_HL is then started.

In S216, flag DE (which was 0) is set to 1, and commutation is performed in S218–222. If HALL=1 in S218, then in S220 OUT1 becomes HIGH; otherwise, OUT2 is set to HIGH in S222. The program consumed a certain amount of time for the program steps S214–S218 performed between the deactivation of ports OUT1 and OUT2 in S212 and the activation of OUT1 or OUT2 in S220 or S222, so that a sufficient commutation gap (FIG. 21: t_G) was maintained (e.g. 50 μs).

Lastly, in S224, the Hall interrupt routine terminates.

If DE=1 was true in S210, then in S230 the program requests calculation of the Hall length t_H and the new timer value t_TI for the ignition angle shift function. The main program is constructed using a function manager that is described in more detail below in FIG. 15. With the function manager, it is possible to request routines by setting flags, and to cancel the request by resetting the flags. To request the calculation, in S230 a flag FCT_ZWV is set to 1.

A possible alternative to S230 is to perform the calculation directly in the Hall interrupt routine (FIG. 8). This is indicated by S232. If the calculation is performed in S232, then the Hall time $t\_H_{N+1}$ (e.g. $t\_H_4$) can be used to calculate the timer interrupt time t_TI which is associated with the Hall time $t\_H_N$ (e.g. $t\_H_5$). If S230 is used, then the Hall time $t\_H_{N-2}$ (e.g. $t\_H_3$), or an even earlier Hall time, is used, as described in FIGS. 17 through 19. If the calculation is performed in the Hall interrupt (S232), then S230 is omitted. The description below refers to a version without S232.

S234 (FIG. 8B) checks whether flag KD (commutation done) is equal to 1. If KD=1, then a timer interrupt occurred in the Hall time belonging to the Hall interrupt, as depicted in FIG. 7A for $H_{N+1}$, and the ignition angle shift function was switched on. In this case, commutation has already been performed in the timer interrupt ($T_{N+1}$ in FIG. 7A), and execution branches directly to S238.

If KD=0 in S234, then a timer interrupt did not occur in the Hall time belonging to the Hall interrupt, i.e. the situation is as shown in FIG. 6. In S236 the commutation gap (t_G in FIG. 21) is started by setting both ports OUT1 and OUT2 to zero, i.e. energy delivery to stator winding 38 (FIG. 1) is briefly discontinued. The case in which a timer interrupt has occurred, but no commutation occurred during that interrupt because the ignition angle shift function was inactive, is dealt with in the branch below S210 for DE=0 (FIG. 8A).

In S238, autoreload register AR and timer CNT_HL are loaded with the value t_TI calculated in the ignition angle calculation function described below (FIG. 9 or 19), and timer CNT_HL is started.

In S240, the ignition angle shift function is activated by setting the value of flag SZW to 1, since the necessary rotation speed—in this instance, for example, the rotation speed of 300 rpm—has been reached (DE=1).

Step S242 once again checks, based on flag KD (commutation done), whether commutation has already taken place. If not (KD=0), S244 checks on the basis of signal HALL whether either OUT1 has been set to HIGH in S246, or OUT2 has been set to HIGH in S248. The commutation gap (t_G in FIG. 21) is generated, in this context, by steps S238 through S244 located between the deactivation of ports OUT1 and OUT2 (S236) and their activation.

Lastly, execution leaves the Hall interrupt routine at S250.

Figure 15:
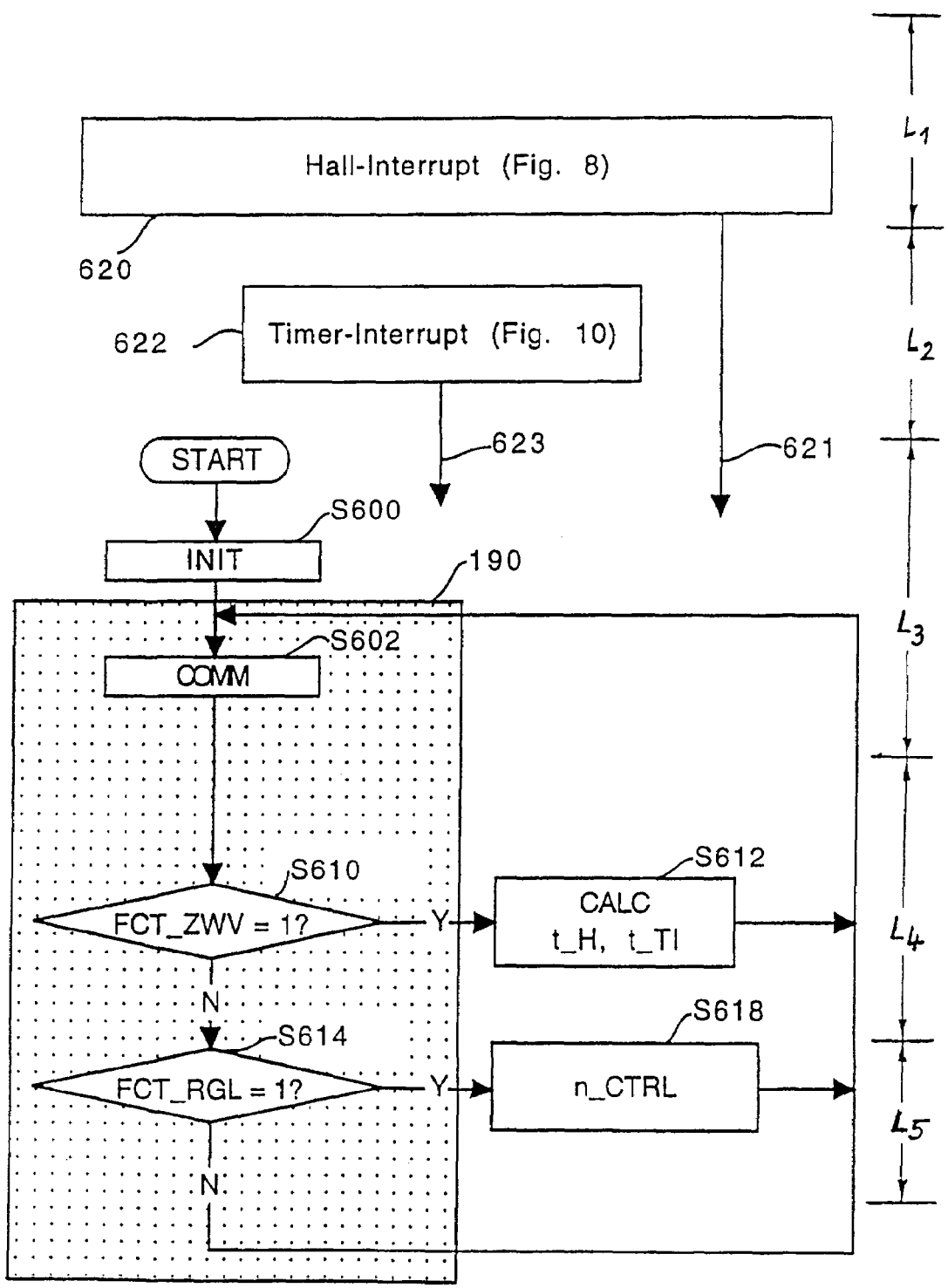
FIG. 15 depicts a preferred embodiment of a function manager.

FIG. 9 is a flow chart of an example of an ignition angle calculation routine which is invoked (cf. S230 in FIG. 8A), once the minimum rotation speed has been reached, in each Hall interrupt routine (FIG. 8) by setting request bit FCT_ZWV (FIG. 15). Ignition angle calculation is invoked by function manager 190 (FIG. 15) if no higher-priority tasks are being requested. It is therefore impossible to say exactly when this calculation takes place. The instants $B_N$ (e.g. in FIGS. 12A and 12B) at which the ignition angle calculation is performed are therefore not precisely determined, but rather represent examples of instants.

Note that the calculation of the Hall length t_H always applies to a previous Hall time. For example, the Hall length $t\_H_{N-1}$ is calculated during the Hall time $t\_H_N$.

S252 checks, on the basis of flag KD, whether a commutation has been performed (cf. S234 in FIG. 10) in the timer interrupt (e.g. $T_{N+1}$ in FIG. 7). If so (KD=1), then as defined by S254, as shown and described in FIG. 7, the Hall length t_H is determined from the beginning time t_B and the time t_1, which is the difference between t_B and t_E. If not (KD=0), then as defined in S256 the Hall length t_H is determined from the difference between t_B and t_E (cf. FIG. 6).

In S258, a correction time t_CORR is added to the Hall length t_H. This results from the fact that timer CNT_HL is halted at S202 at the beginning of the Hall interrupt routine (FIGS. 8A and 8B), but is not started again until later, in S232. The Hall routine has consumed a certain amount of time by then, which is then added as t_CORR (e.g. 40 μs) in order to obtain the exact Hall length t_H in S258.

In S260, the instantaneous Hall length t_H is stored in the true Hall value t_i, so that the present true Hall value is available to all the other program sections (e.g. the control system) as an indicator of the instantaneous rotation speed.

In S262, the present start time of timer CNT_HL is saved to t_B, so that it is available for the calculation of t_TI during the next Hall time.

A check of the rotation speed is then made, since an ignition angle shift must be performed only above a predefined minimum rotation speed n_min, e.g. 300 rpm. For that purpose, S264 ascertains whether $t_{13}H>t\_SZW$. t_SZW (e.g. 49,664 μs, corresponding to 0xC200) is the maximum Hall length at which an ignition angle shift is to be performed. If t_H is greater than t_SZW, the motor is too slow, and the ignition angle shift function is deactivated in S266 (SZW:=0).

Figure 14:
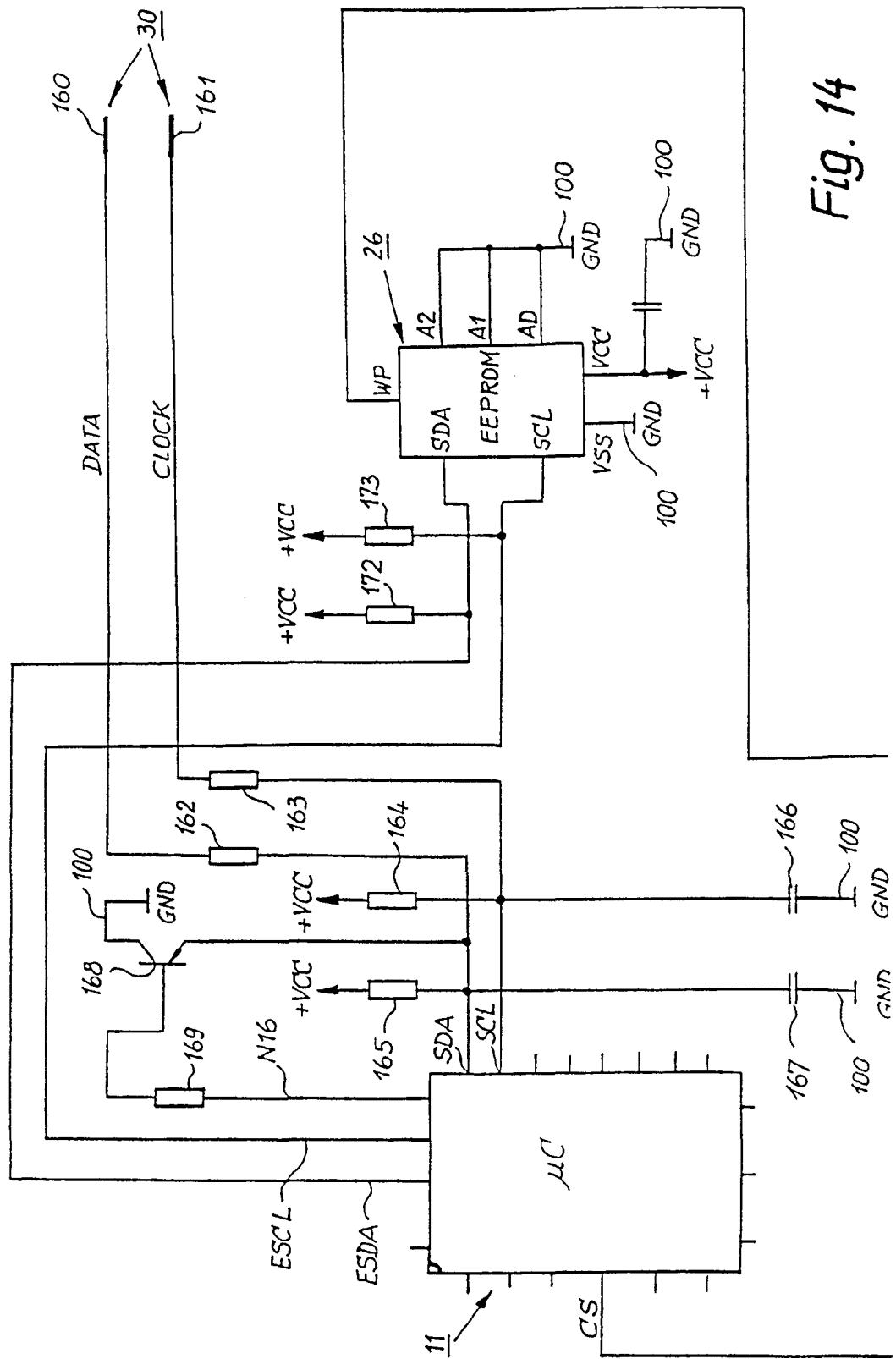
FIG. 14 is a circuit diagram with parts that are important for activating an EEPROM and for data connection via a bus 30.

The commutation instant t_TI, i.e. the instant at which a timer interrupt is to be triggered, is calculated in S268. This is done in S268 by subtracting a value t_ZW, namely the length of time by which the commutation instant is to be advanced, e.g. 200 µs. This can be a constant value, or a value that depends on a motor parameter. This value t_ZW can be modified externally via bus 30 (FIG. 14). If t_ZW=0, then the ignition angle shift function is switched off.

The ignition angle calculation routine has now been executed. The FCT_ZWV request bit (FIG. 15) is set to zero in S270; in S272 flag KD is reset to zero so that it can be used for the next Hall time; and in S274, request bit FCT_RGL (FIG. 15) for the motor control system is set so that it is requested.

The principal tasks of the ignition angle calculation routine as shown in FIG. 9 were therefore to determine the duration of the previous Hall length (S258), calculate the commutation instant for the next Hall time (S268), and request the control system (S274).

FIG. 10 is a flow chart of an example of a timer interrupt routine which provides motor control and is triggered when timer CNT_HL, initialized and started in the previous Hall interrupt, has counted down to zero before the next Hall interrupt is triggered (cf. FIGS. 7A and 7B).

Upon reaching a value of 0, timer CNT_HL is loaded (S302) with the value t_AR of autoreload register AR and restarted, since it is used simultaneously to calculate the Hall length t_H. This step is executed automatically by µC 11 when this counter reaches zero, and is incorporated into the flow chart only for illustration.

S304 checks, on the basis of flag SZW, whether the ignition angle shift function is active. If it is not active, this means the motor is running more slowly than the minimum rotation speed. This is evident from the fact that if the timer interrupt has taken place when the ignition angle shift function is inactive, autoreload register AR and timer CNT_HL are set, in S214 of the Hall interrupt routine, to the maximum Hall length t_max corresponding to the minimum rotation speed n_min. If the timer interrupt ($T_{N+1}$ in FIG. 7) nevertheless takes place before the Hall interrupt ($H_{N+1}$ in FIG. 7), then the minimum rotation speed n_min has not been reached and flag DE (rotation speed reached) is set to zero, and execution leaves the timer interrupt routine at S308.

If the ignition angle shift function is active (SZW=1), execution branches from S304 to S310, where the two ports OUT1 and OUT2 are set to 0 at the beginning of the commutation gap.

Steps S312 through S316 constituted a program loop which creates a commutation gap (t_G in FIG. 21) of sufficient length. For this purpose, in S312 a counter DEL_CNT has a delay value t_DEL assigned to it, e.g. the number 5. In S314, counter DEL_CNT is decremented by 1; S316 then checks whether DEL_CNT has reached a value of zero, i.e. whether the delay loop has been completely executed. If not, execution branches back to S314 and the loop continues. If one pass through the loop requires, for example, 10 µs, then the aforesaid values yield a delay of 50 µs during which ports OUT1 and OUT2 each have an output signal of 0, creating the commutation gap t_G.

Commutation then takes place in the usual way, as already described in FIG. 8A, S218 through S224. If the Hall value HALL=1 in S318, then OUT1 is set to HIGH in S320; otherwise OUT2 is set to HIGH in S322. Commutation has thus been performed—with ignition angle shifting—in the timer interrupt and before the Hall interrupt, i.e. in FIG. 7 at instant $T_{N+1}$ before the Hall interrupt $H_{N+1}$.

In S324, flag KD (commutation done) is set to 1 so that the Hall interrupt routine and the ignition angle calculation routine can recognize that fact, and execution then leaves the Hall interrupt routine at S326.

Figure 11:
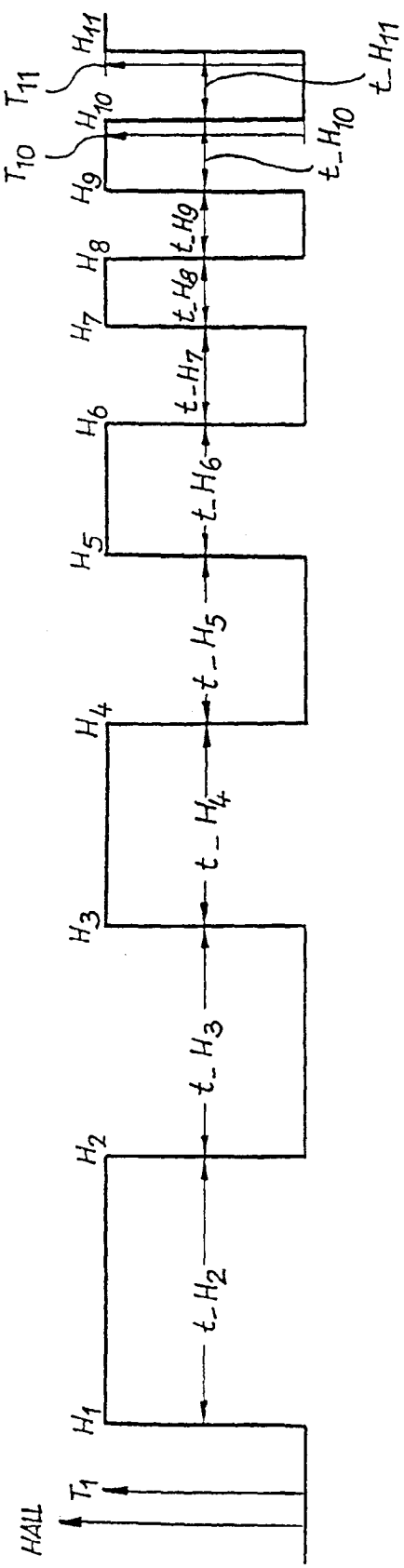
FIG. 11 depicts the Hall signal during acceleration of a motor.

FIG. 11 shows, by way of example, a signal HALL along with the instants of the Hall interrupts $H_N$ and the timer interrupts $T_N$ during acceleration of a motor according to the present invention. The Hall times $t\_H_N$ that are located between the respective Hall interrupts $H_{N-1}$ and $H_N$ become increasingly shorter because the motor is accelerating. A timer interrupt does not occur during each Hall time. In this example an ignition angle calculation is performed in $t\_H_2$ and in the subsequent Hall times; but because of the acceleration of the motor, in this example only the timer interrupts $T_1$, $T_{10}$, and $T_{11}$ occur, since the rotation speed becomes approximately constant only as of $t\_H_8$.

Figure 12A:
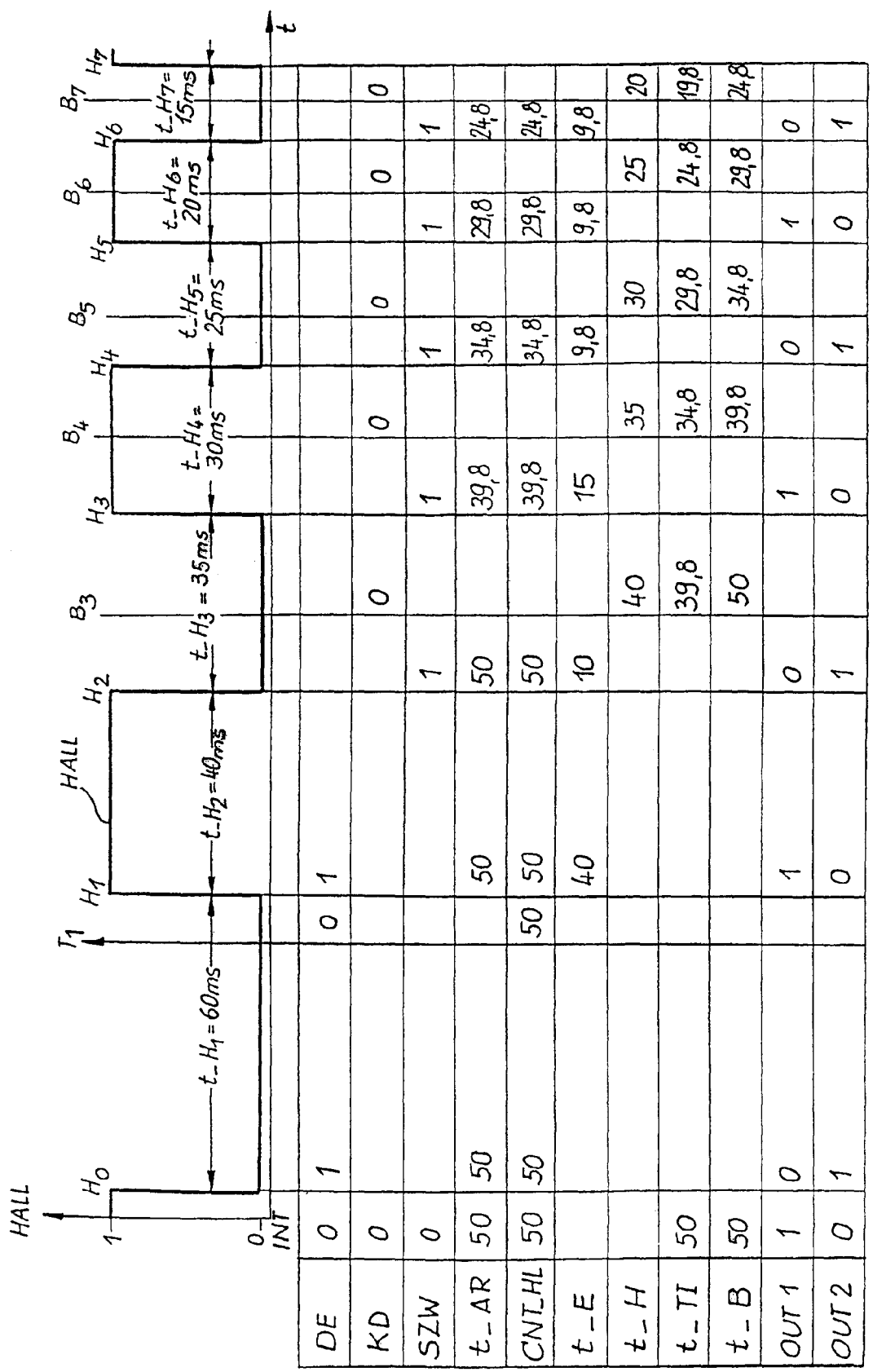
FIGS. 12A and 12B depict the Hall signal and the associated variables of the drive function.
Figure 12B:
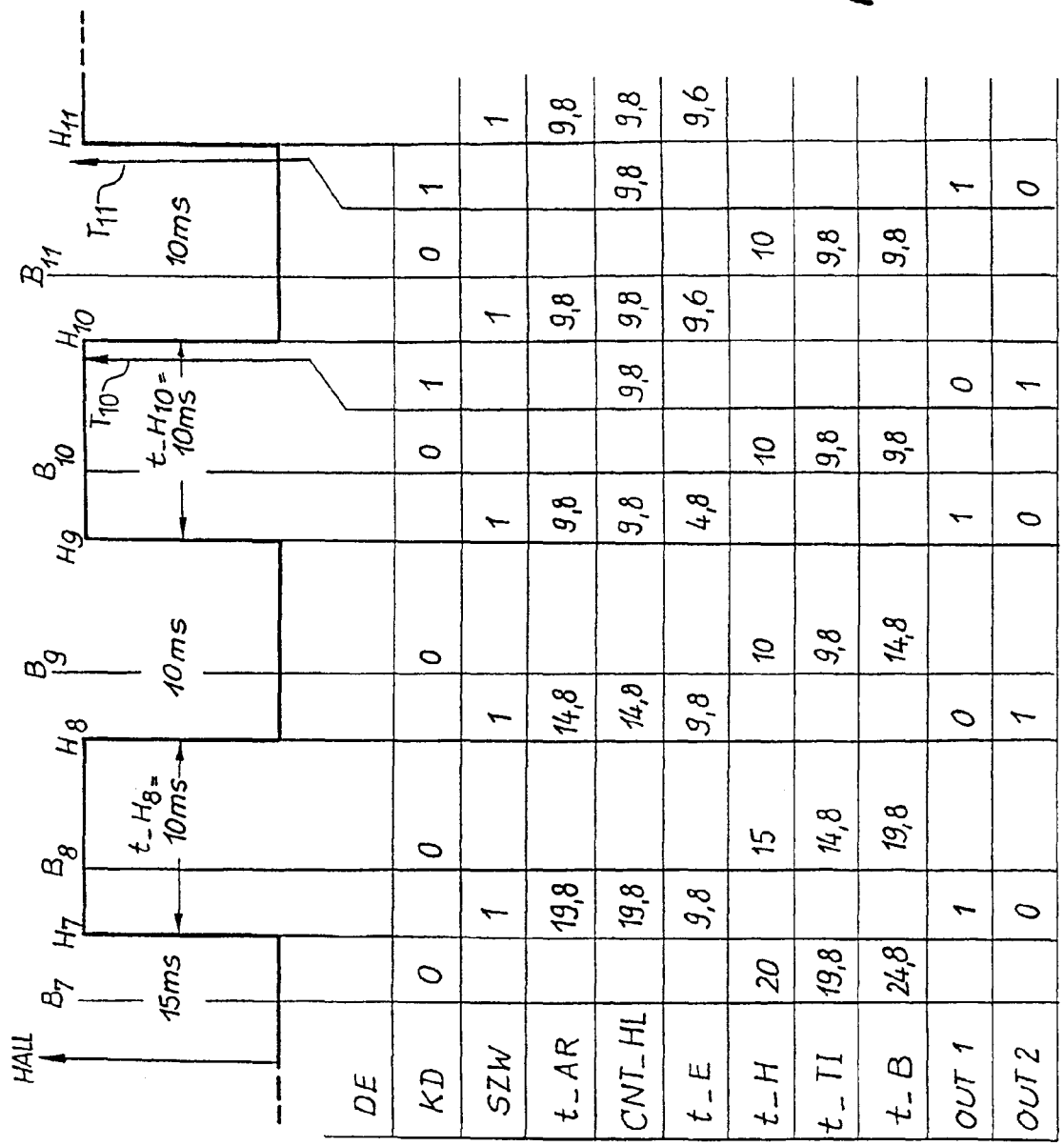

FIGS. 12A and 12B show the profile shown in FIG. 11 at enlarged scale and with additional explanations.

FIGS. 12A and 12B show an example of changes over time during startup of a motor according to the present invention, intended to illustrate the interplay between the Hall interrupt, the ignition angle calculation, and the timer interrupt.

The following variables are used in FIGS. 12A and 12B:

| | |
|---|---|
| DE: | "Rotation speed reached" flag |
| KD: | "Commutation done" flag |
| SZW: | "Start ignition angle shift" flag |
| t_AR: | Value in autoreload register AR (FIG. 1) |
| CNT_HL: | Timer for timer interrupt and calculation of Hall length |
| t_E: | Stop time (end time) |
| t_H: | Hall length (Hall time) |
| t_B: | Start time (beginning time) |
| OUT1: | Port of µC 11 for energization of the motor |
| OUT2: | Port of µC 11 for energization of the motor. |

Signal HALL at the Hall input of µC 11 is plotted. The Hall lengths t_H are respectively located between the Hall interrupts which surround them, e.g. $t\_H_2$=40 ms between $H_1$ and $H_2$, $t\_H_3$=35 ms between $H_2$ and $H_3$, etc. Hall interrupts are indicated in each case as $H_N$, timer interrupts as $T_N$, and executions of the ignition angle calculation function as $B_N$, where N is the index of the associated Hall length $t\_H_N$.

Located below signal HALL are certain important variables which are used in the program that executes in µC 11. For space reasons, times are indicated in ms, although the program operates internally with time in µs. Some of the variables are initialized when the motor is started (INIT column). t_TI and t_B are initialized at 50 ms. This corresponds to a rotation speed of 300 rpm, and it is only above this rotation speed that, in this exemplary embodiment, the ignition angle shift function is switched on. DE and KD are set to 0, since the requisite rotation speed has at first not been reached; and SZW is also initialized at zero because the ignition angle shift function is switched off.

At the first Hall interrupt H0, autoreload register AR and timer CNT_HL are loaded for the first time with a value of 50 ms, and timer CNT_HL is started. The Hall length $t\_H_1$ is 60 ms, so that the timer interrupt T1 occurs before Hall interrupt H1.

Since the ignition angle shift function is switched off (SZW=0), all that happens in the timer interrupt routine is that the value DE is set to 0 (S306 in FIG. 10). This indicates to the Hall interrupt that the motor has not yet reached the minimum rotation speed n_min, since the Hall length $t\_H_1$ is longer than the maximum Hall length t_max (which corresponds to the minimum rotation speed n_min). Timer CNT_HL is automatically loaded with the autoreload value t_AR of 50 ms, and started.

The Hall interrupt $H_1$ invokes the Hall interrupt routine (FIG. 8). The stop time t_E of 40 ms, which results from the fact that 10 ms has elapsed between the timer interrupt $T_1$ (at which timer CNT_HL was once again set to 50 ms) and the Hall interrupt $H_1$, is saved. Since DE=0, commutation is performed at instant $H_1$, t_AR and CNT_HL are loaded with a value of 50 ms, and timer CNT_HL is started. DE is set to 1. No calculation is requested.

During the Hall length t_$H_2$, the motor reaches, on average, the minimum rotation speed of 300 rpm for the first time, so that the Hall interrupt $H_2$ is triggered before timer CNT_HL has counted down to zero. A timer interrupt $T_2$ therefore does not take place.

In the Hall interrupt routine, at Hall change $H_2$ the stop time t_E of timer CNT_HL (=10 ms) is saved. Because a timer interrupt did not occur during the Hall length t_$H_2$, DE has retained its value DE=1. The Hall interrupt routine recognizes from this that the rotation speed of 300 rpm has been exceeded. In the Hall interrupt routine, the ignition angle calculation routine (FIG. 9) is requested, and ignition angle shifting is activated by SZW:=1. Because commutation has not yet occurred within the Hall length t_$H_2$ (KD=0), commutation is performed during the Hall interrupt routine at instant H2. Because an ignition angle calculation has not yet been performed, autoreload register AR and timer CNT_HL are loaded with the value t_TI that was initialized at 50 when the motor started, and timer CNT_HL is restarted.

During the Hall length t_$H_3$, the calculation of the ignition angle shift is performed for the first time. A timer interrupt has not occurred (KD=0), so that the Hall length t_$H_2$, calculated during the Hall length t_$H_3$, is determined (from t_B=50 ms and t_E=10 ms) as t_H=40 ms. With an ignition angle shift time t_ZW=0.2 ms, this yields a timer interrupt time of 39.8 ms. The timer start time of the Hall time t_$H_3$ is saved in t_B.

The Hall interrupt routine for Hall interrupt $H_3$ proceeds similarly to the Hall interrupt routine for Hall interrupt $H_2$, since the motor is still accelerating and the Hall interrupt occurs before timer CNT_HL reaches a value of 0. A timer interrupt therefore does not occur in this Hall time. This is also the case in Hall interrupts $H_4$, $H_5$, $H_6$, and $H_7$. The ignition angle calculation routines $H_4$, $H_5$, $H_6$, and $H_7$ are also invoked in the respective Hall times.

In the Hall time t_$H_8$, the motor finally reaches its nominal rotation speed of 1500 rpm which corresponds to a Hall length of 10 ms. Since, in this example, the timer interrupt time t_TI for the Hall time t_$H_N$ is always calculated during the Hall time t_$H_{N-1}$ from the Hall length t_$H_{N-2}$, there is a "lag" of two Hall times, i.e. the first Hall time at which timer CNT_HL is started with the correct timer interrupt time t_TI is t_$H_{10}$, since the Hall time t_$H_8$ was the first Hall time with 10 ms, and the result of the Hall length calculation for the Hall time of t_$H_8$ is not used until t_$H_{10}$.

During the Hall time t_$H_{10}$, the ignition angle calculation $B_{10}$ is performed normally. The start value t_TI for autoreload register AR and timer CNT_HL during the Hall interrupt routine for $H_9$ was 9.8 ms.

A timer interrupt $T_{10}$ is therefore triggered 9.8 ms after the Hall interrupt $H_9$. Timer CNT_HL is automatically loaded with the value t_AR (9.8 ms), and restarted. The ignition angle shift function is switched on (SZW=1), so that commutation occurs in the timer interrupt routine (T10). Flag KD is set to 1 in order to indicate to the next Hall interrupt routine (for $H_{10}$) and to the ignition angle calculation function that commutation has taken place.

In the Hall interrupt routine for the Hall interrupt $H_{10}$, the stop value of timer CNT_HL is saved in t_E, the ignition angle calculation routine is requested, autoreload register AR and timer CNT_HL are loaded, and timer CNT_HL is started. Since commutation has already taken place in the timer interrupt routine for the timer interrupt $T_{10}$, no further commutation occurs.

The subsequent Hall times t_$H_{11}$, etc. proceed similarly to t_$H_{10}$ if the true or reference rotation speeds of the motor do not change.

MOTOR CONTROL SYSTEM

Figure 13:
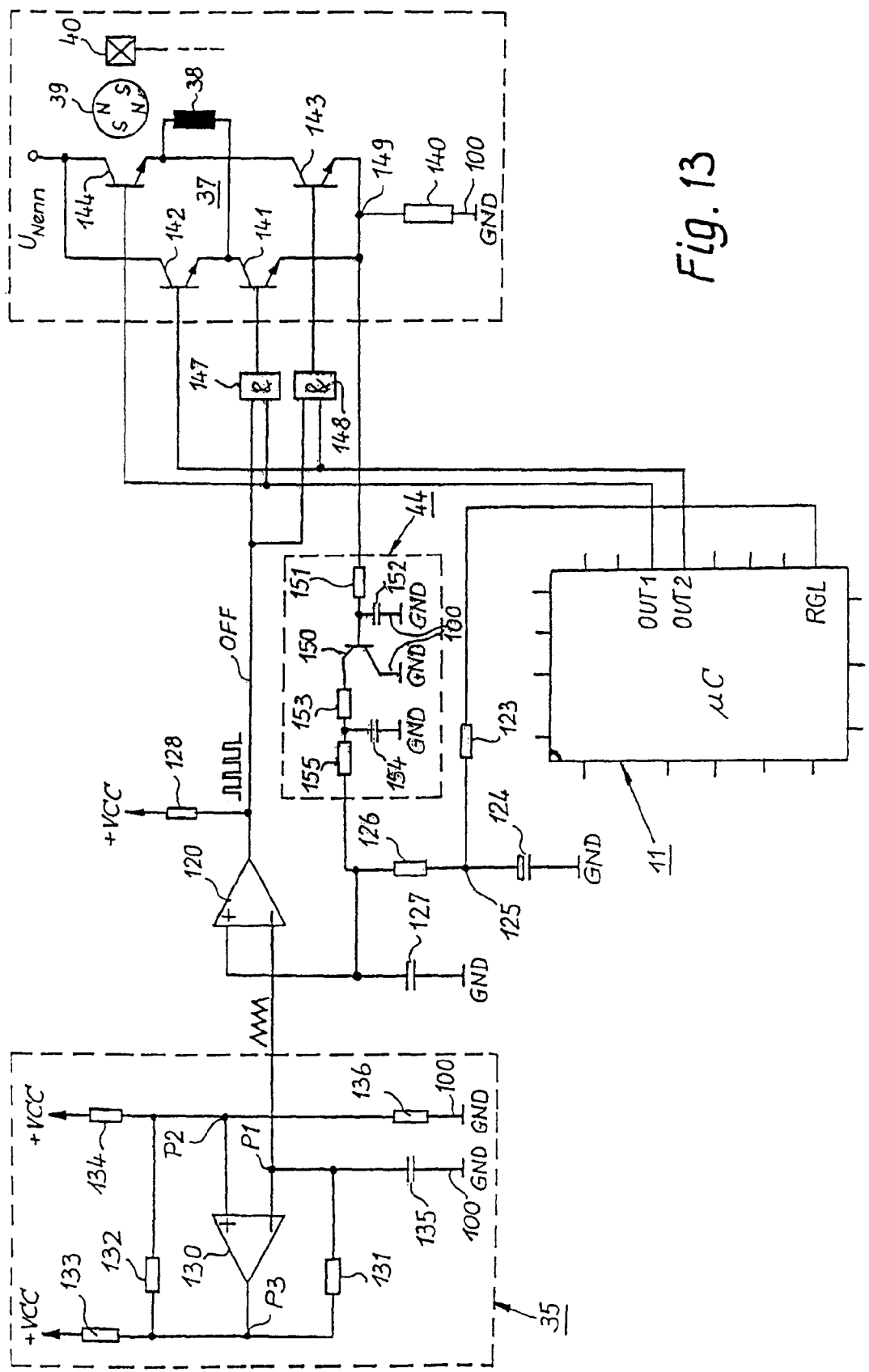
FIG. 13 is a circuit diagram with parts that are important for controlling and driving the electronically commutated motor.

FIG. 13 shows the portion of the circuit important for controlling and driving the motor. Parts that are identical or functionally identical to those in previous Figures are labeled with the same reference characters as therein, and usually are not described again.

The assignment of the terminals of μC 11 is once again evident from FIG. 3. Outputs OUT1 and OUT2 of μC 11 control npn transistors 141, 142, 143, and 144, connected as an H-bridge 37.

An output RGL of μC 11 is connected via a resistor 123 to a capacitor 124. If RGL is set to HIGH, capacitor 124 is charged; if RGL is LOW, then the capacitor is discharged; and if RGL is at TRISTATE, capacitor 124 is decoupled from RGL and retains its voltage. Without current limiter 44, which is described below, node 125 could be connected directly to the positive input of comparator 120.

If npn transistor 150 is not conductive (i.e. if current limiter 44 is inactive), a voltage identical to that of capacitor 124 is established via resistor 126 at a smaller capacitor 127. The voltage at the positive input of comparator 120 can thus be influenced via output RGL of μC 11.

A triangular signal generated by a sawtooth oscillator 35 is present at the negative input of comparator 120. Sawtooth oscillator 35 has a comparator 130. A positive feedback resistor 132 leads from output P3 of comparator 130 to its positive input; similarly, a negative feedback resistor 131 leads from output P3 of comparator 130 to the negative input of comparator 130. A capacitor 135 is present between the negative input of comparator 130 and ground 100. The output of comparator 130 is moreover connected via a resistor 133 to +Vcc. The positive input of comparator 130 is connected via two resistors 134 and 136 to +Vcc and to ground 100, respectively.

Reference is made to DE 198 36 882.8 and corresponding U.S. Ser. No. 09/720,221, HORNBERGER et al. for an explanation of the manner of operation of sawtooth generator 35 and the way in which output RGL of μC 11 is controlled by μC 11.

If the voltage of the triangular signal at the negative input of comparator 120 is below that of the reference signal at the positive input of comparator 120, output OFF of comparator 120 is then HIGH, and the lower transistors 141 and 143 can be switched on and off, via logical AND elements 147 and 148, by OUT1 and OUT2, respectively. If the voltage of the triangular signal is above that of the reference signal, output OFF of comparator 120 is then LOW and stator winding 38 therefore cannot be energized.

The voltage at capacitor 124 and therefore also at capacitor 127 thus establishes the so-called pulse duty factor, i.e. the ratio between the time the output of comparator 120 is at HIGH during a period of the triangular signal, and one entire period. The pulse duty factor can be between 0% and 100%. If the motor rotation speed is too high, for example, capacitor 124 is discharged via RGL and the pulse duty factor is thus reduced. All this is referred to as pulse width modulation (PWM). The purpose of pull-up resistor 128 is to pull the open collector output OFF of comparator 120 to +Vcc when it is HIGH.

To allow the motor to be started when switched on, capacitor 124 is charged via RGL for a predefined period of time at initialization, so that the voltage at capacitor 127 reaches the necessary minimum value for activation of comparator 120 and thus of bridge 37.

A current limiter 44 is implemented by the fact that the current in stator winding 38 flows through a measurement resistor 140 to ground 100. The higher the current through resistor 140, the higher the voltage at it and thus also the higher the potential at node 149.

When the potential at 149 reaches a specific value, transistor 150 becomes conductive and reduces the voltage at capacitor 127, and the pulse duty factor at the output of comparator 120 thereby becomes lower. Resistor 126 prevents the large capacitor 124 from also being discharged during current limitation, and accelerates current limitation because the small capacitor 127 can be discharged more quickly. After active current limitation ends, the smaller capacitor 127 is recharged by the large capacitor 124 and is thus set to its voltage. Resistor 126 and capacitor 127 therefore ensure that current limiter 44 possesses a higher priority than the control system.

Current limiter 44 has a filter member made up of a resistor 151 and a capacitor 152 to ground, followed by npn transistor 150 which, when the voltage at its base is sufficiently high, pulls the positive input of comparator 120 to ground 100. Behind this follows a further filter member comprising resistors 153 and 155 and capacitor 154.

Reference is made to DE 198 26 458.5 and corresponding U.S. Ser. No. 09/719,440, KARWATH et al. for a description of an alternative form of current limiter. As therein, it can also be constructed using a comparator and can be program-controlled.

EEPROM FUNCTION

FIG. 14 shows the portion of the circuit that is relevant to EEPROM 26 and bus interface 30. The pin assignment of μC 11 is again evident from FIG. 3. Parts identical or functionally identical to those in previous figures are labeled with the same reference characters as therein. EEPROM 26 is, for example, an AT24CO1A two-wire serial CMOS EEPROM (ATMEL).

EEPROM 26 receives signal ESDA (FIG. 2) of μC 11 at its data input SDA, and signal ESCL at its SCL input. Both lines are connected via resistors 172, 173 to +Vcc.

Write-protect input WP of EEPROM 26 is connected to pin CS (Chip Select) of μC 11. If CS is HIGH, EEPROM 26 is write-protected; if CS is LOW, data can be written into EEPROM 26. Terminals VSS, A0, A1, and A2 of EEPROM 26 are connected to ground 100, and terminal VCC of EEPROM 26 is connected to +Vcc.

Lines ESDA and ESCL thus represent the serial bus between μC 11 and EEPROM 26, which here is operated as an IIC bus.

EEPROM 26 is normally programmed once at the factory via bus interface 30, but reprogramming is possible at any time. Alternatively, the motor can also be operated without bus 30; EEPROM 26 is then programmed by means of a known apparatus before it is introduced into the motor.

Bus interface 30 works with an IIC bus. It has a DATA line with a terminal 160, which is connected via a resistor 162 to terminal SDA of μC 11. From terminal SDA, a resistor 165 goes to +Vcc and a capacitor 167 goes to ground 100. Terminal SDS is also connected to the emitter of a pnp transistor 168 whose collector is connected to ground 100 and whose base is connected via a resistor 169 to terminal N16 of μC 11.

Bus interface 30 also has a CLOCK line with a terminal 161, which is connected via a resistor 163 to terminal SCL of μC 11. From terminal SCL of μC 11, a resistor 164 goes to +Vcc and a capacitor 166 goes to ground 100.

The purpose of the circuit with pnp transistor 168 is to connect both output N16 and input SDA of μC 11 to the bidirectional DATA line of the IIC bus.

For a more detailed description of EEPROM 26, bus interface 30, and their programming, the reader is referred to DE 198 26 458.5 and corresponding U.S. Ser. No. 09/719, 440, KARWATH et al.

With bus interface 30, it is possible to modify values in EEPROM 26. For example, the minimum rotation speed n_min above which commutation with an ignition angle is to be activated can be modified by setting the value t_SZW in the EEPROM, thus changing the configuration of the motor. The ignition angle time t_ZW can also, for example, be changed.

FUNCTION MANAGER

FIG. 15 shows a flow chart with one possible embodiment of the overall program that executes in μC 11. After the fan is turned on, an internal reset is triggered in μC 11. Initialization of μC 11 occurs in S600. For example, parameters are transferred from EEPROM 26 into the RAM of μC 11.

After initialization, execution branches into the aforementioned function manager 190, which begins in S602. This controls the execution of the individual subprograms and determines their priorities.

The functions executed first are those that are time-critical and must be executed at each pass. These include the communication function COMM in S602, since at a baud rate of, for example, 2 K, IIC bus 30 (FIG. 14) must be checked every 250 μs.

Figure 16:
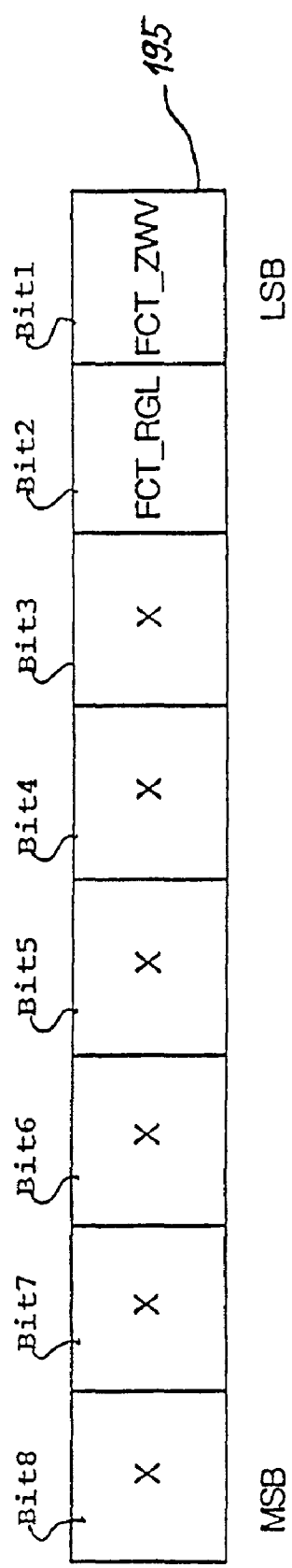
FIG. 16 shows a function register used in the function manager.

FIG. 16 shows an example of a function register 195 in which one bit is reserved for each additional function.

In this example, function register 195 is 1 byte long; beginning with the least significant bit (LSB), the following request bits are defined for the requestable functions explained below:

| | |
|---|---|
| Bit 1: | FCT_ZWV for the ignition angle calculation routine; |
| Bit 2: | FCT_RGL for a control routine of any kind. |

The remaining bits are reserved for additional requestable functions that can be inserted into function manager 190 as necessary.

If a specific requestable function is to be requested by another function or by an interrupt routine, the bit of the function being requested is set to 1. That function is executed the next time function manager 190 performs a pass and finds no other requestable function with a higher priority.

Once a requested function has been processed, it sets its bit (FIG. 16) back to zero, e.g. FCT_RGL:=0.

In FIG. 15, after S602 a check is made, in a predetermined sequence starting with the most important requestable function, as to whether each function's request bit is set. If such is the case for a function, it is performed, and execution then branches back to the beginning (S602) of function manager 190. The sequence in which function register 195 is checked defines the prioritization of the requestable functions. The higher up a function is located in function manager 190, the higher its priority.

The functions that are invoked must be so short that their execution time, added to the functions that are always performed (here S602) and the interrupt routines, is never longer than the maximum permissible time between two polls of IIC bus 30. In the example above with a baud rate of 2 K and a maximum permissible time of 250 µs, the maximum execution time for the functions invoked in S610 or S614 is approx. 100 µs.

S610 checks whether request bit FCT_ZWV for the ignition angle shift function is set, i.e. has a value of 1. If it is set, execution then branches to S612 and the ignition angle calculation routine (FIG. 9 or 19) is performed. Before terminating, the ignition angle calculation routine resets its request bit FCT_ZWV, and requests the control routine in S274 by setting request bit FCT_RGL.

If S610 finds that FCT_ZWV was not set, S614 then checks whether FCT_RGL is set. If so, a control routine for controlling the motor rotation speed is invoked in S618.

If neither of the bits checked in S610 and S614 was set, execution then branches back to S602, and the functions that are performed at each pass of function manager 190 are invoked again.

At 620, FIG. 15 also symbolically shows a Hall interrupt, which has the highest priority L1 (level 1). A Hall interrupt has this high priority because accurate sensing of the Hall signals is very important for quiet operation of motor 39. It interrupts all processes of function manager 190, as symbolized by an arrow 621.

Shown below the Hall interrupt (at 622) is a timer interrupt. This has a lower priority L2 and interrupts all the processes below it, as indicated by arrow 623. Exact commutation is also very important for quiet motor operation, and timer interrupt 622 therefore has the second-highest priority.

If a Hall interrupt and timer interrupt were requested simultaneously, they would be executed in the order of their priority.

The COMM function has the next-lower priority L3, since data must never be lost during communication via bus 30.

The ZWV function, which can be requested in S230 and is depicted in FIG. 9 (or 19), has the next-lower priority L4.

The RGL function (S614) has the lowest priority L5, since the rotation speed of a motor usually changes slowly because of its mechanical inertia, so that the control function is, in most cases, not time-critical. If appropriate, however the sequence of steps S610 and S614, and thus their priorities, can also be interchanged.

It is possible in this fashion to classify the various "needs" of motor 39 into a predefined hierarchy, and to use the resources of µC 11 optimally for operation of the motor.

IGNITION ANGLE SHIFTING FUNCTION TAKING INTO ACCOUNT MAGNETIZATION ERRORS IN ROTOR 39

FIG. 17 shows a four-pole external rotor 39. It has four radially magnetized poles 534, 535, 536, 537 which are separated from one another in the manner depicted by (symbolically indicated) transition regions 530 through 533. As an example, so-called trapezoidal magnetization is assumed to be present (cf. FIG. 18A).

Because of inhomogeneities in the magnet material and because of unavoidable errors in the magnetization apparatus (not shown), the profile of the magnetic flux density, especially in the transition regions 530 through 533, is not exactly defined, but rather differs slightly from one rotor to another.

If it is assumed that rotor 39 rotates past Hall generator 40 in the direction of arrow 540, what is obtained at Hall operator 40 is a Hall voltage $u_H$ whose characteristic is shown in FIG. 18A (greatly exaggerated for illustrative purposes). Portion 534' of this Hall voltage $u_H$ is generated by rotor pole 534 (North pole) and is slightly too short, i.e. the zero transitions of this Hall voltage are located at 0° (elec.) and approximately 170° (elec.) rather than, as intended, at 0° (elec.) and exactly 180° (elec.).

Portion 535' of the Hall voltage is generated by rotor pole 535. It begins at approximately 170° (elec.) and ends at approximately 370° (elec.), and is too long.

Portion 536' is generated by rotor pole 536 and extends from approximately 370° (elec.) to approximately 550° (elec.); it thus has the correct length but not the correct phase position.

Portion 537' is generated by rotor pole 537 and extends from approximately 550° (elec.) to 720° (elec.), i.e. is slightly too short. In this motor, 720° (elec.) corresponds once again to 0° (elec.) because rotor 39 has then performed one complete revolution, and the voltage curve then repeats as indicated in FIG. 18A at 534'A.

FIG. 18B shows the associated signal HALL, which is a mirror image of the magnetization errors just explained; in other words, its first segment 534" is too short, its second segment 535" is too long, its third segment 536" is phase-shifted, and its fourth segment 537" is too short. A segment 534"A that corresponds (at constant rotation speed) to segment 534" begins after the 720° (elec.) angle.

Segments 534" and 537" therefore simulate a rotation speed that is too high, and segment 535" simulates a rotation speed that is too low.

If segment 534" is used to calculate time t_TI for segment 536", as was explained in the context of the exemplary embodiment above, commutation in segment 536" will then take place too early.

If segment 535" is used to calculate time t_TI for segment 537", commutation there will take place too late.

This can result in irregular motor operation, and in increased motor noise.

According to the invention, therefore, a segment of signal HALL is used in order to calculate time t_TI for the segment one rotor revolution later, as shown symbolically and by way of example in FIG. 5 with the reference characters 304, 306, 308 for a four-pole rotor. In FIG 18B, for example, Hall length $t\_H_N$ of segment 534" is used to calculate time t_TI for segment 534"A, as shown symbolically and by way of example at 542, 544, 546. These errors then do not occur, since at a constant rotation speed segments 534" and 534"A, for example, are identical, so that errors cannot add up.

FIG. 19 shows a corresponding modified ignition angle calculation routine for commutation with ignition angle shifting, a compensation for magnetization defects of rotor 39 being performed in the preferred manner described. All parts that have already been presented in FIG. 9 receive the same reference characters as therein, and are therefore not described again. The reader is referred to the description in that context.

In step 268', instead of a direct calculation of timer start value t_TI (cf. S268 in FIG. 9), two variables t_4 and t_3 are additionally used to buffer the calculated timer start values t_TI. The timer start value t_TI used for the next Hall time t_H$_N$ is assigned timer start value t_4 calculated from the Hall length t$_{HN}$_4.

The calculated timer start values are then shifted so that they are present in the correct variables for the next ignition angle calculation. The value t_3 that was calculated from the Hall length t_H$_{N-3}$ is shifted to t_4, and the timer start value calculated in the present ignition angle calculation (t_H–t_ZW) is stored in t_3. (In this case t_H is the Hall length t_H$_{N-2}$.)

A new step S267 is also inserted. When the ignition angle shift function is deactivated (SZW:=0 in S266), memory variables t_4 and t_3 are set to a value of 50,000 so that they have a defined state.

FIG. 20 shows an example of a Hall interrupt routine for a commutation according to the present invention without ignition angle shifting, as depicted in FIG. 4. At each Hall interrupt (Y in FIG. 4), the program that is currently running is interrupted, the so-called environment of µC 11 (e.g. the stack pointer and register) is stored, and the interrupt routine pertinent to the interrupt is invoked. When the interrupt routine has executed, it issues a RETI (return from interrupt) command. The environment of µC 11 is then restored to what it was before the interrupt, and the interrupted program continues to execute.

In this exemplary embodiment, the Hall length HL (FIG. 4) is again measured using the 16-bit timer CNT_HL, which continuously counts down beginning from a predefined start value and, if counting continues, jumps back to its maximum value upon reaching zero; in other words, it behaves like a ring counter. Here again, this timer is a component of µC 11. The Hall length HL can be used here, for example, for a rotation speed control function.

In S702, the true Hall length HL (cf. FIG. 4) is determined. A present timer value t_E (FIG. 4) is read out from timer CNT_HL, and a stored "old" timer value t_O (FIG. 4; the instant of the previous timer interrupt Y) is subtracted in order to calculate the Hall length HL. This is done by calculating t_E–t_O and taking the two's complement of the result. This always yields the correct counter difference provided the counter has continued by no more than half its maximum value.

The present timer value t_E is then stored in t_O (S702). The resolution of timer CNT_HL used in this exemplary embodiment is 1 µs, and the Hall length HL is therefore provided in µs.

For example, if t_O=45,000 and t_E=35,000, the result is a Hall length HL=(45,000–35,000)=10,000, corresponding to 10,000 µs.

Commutation is performed in the steps that follow. S704 checks whether Hall=1 (HIGH). If HALL=1, then in S710 OUT2 is set to LOW, OUT1 and OUT2 are now LOW, and in S712 a commutation gap time is inserted to prevent a short circuit in bridge circuit 37 during commutation. The commutation gap has a duration of, for example, 50 µs. In S714, OUT1 is set to HIGH, Lastly, in S716 port Hall of µC 11 is configured for the edge at which it will trigger a Hall interrupt HALL_INT. The edge can be set so that an interrupt is triggered either at the HIGH to LOW transition (trailing edge) or at the LOW to HIGH transition (leading edge). Since the Hall signal is HIGH in the branch from S710 to S716, port HALL must be set for a trailing-edge (i.e. HIGH to LOW) interrupt so that a Hall interrupt is again triggered at the next Hall change. This is done in S716.

If HALL=0 (LOW) in S704, then commutation occurs analogously in reverse fashion in S720, S722, S724, and HALL_INT is set in the reverse direction in S726. In S730, execution leaves the Hall interrupt routine shown in FIG. 20.

FIG. 21 schematically shows the commutation process for n>300 rpm, for example 2000 rpm, i.e. with ignition angle shifting.

FIG. 21A shows the rotor position signal HALL, which triggers a rotor position-dependent interrupt (FIG. 8), i.e. a Hall interrupt as indicated by Y in FIG. 4, at each of the points H$_N$, H$_{N+1}$, H$_{N+2}$.

Beginning at Hall interrupt H$_N$, timer CNT_HL measures the time t_TI, which is calculated according to equation (6) from the values t_HN and t_ZW. As already indicated, the value t_ZW can be modified by way of bus 30.

At time T$_{N+1}$, timer CNT_HL reaches a value of 0 and triggers a motor control interrupt routine as shown in FIG. 10, i.e. a timer interrupt.

As shown in S310 in FIG. 10, at time T$_{N+1}$ signals OUT2 (FIG. 21B) and OUT1 (FIG. 21C) are both set to zero, i.e. current delivery to winding 38 is discontinued; and after a commutation gap t_G (implemented by program steps S312, S314, S316), at S322 signal OUT1 is set to HIGH (since Hall=1), while OUT2 remains LOW, as stored in step S310. Because OUT1=HIGH, transistors 141 and 144 in FIG. 1 become conductive.

Similarly, at time T$_{N+2}$ step S310 of the routine shown in FIG. 10 causes the two signals OUT1 and OUT2 to be set to LOW; and then after commutation gap t_G, the value of OUT2 is set to HIGH because HALL=0 (cf. steps S318, S322 of FIG. 10) while OUT1 retains its LOW value that was stored in step S310. As a result, transistors 142 and 143 in FIG. 1 become conductive.

FIG. 22 at the bottom shows signal HALL, and at the top shows current i_M (FIG. 1) in the single stator winding 38. In FIG. 22, the ignition angle shift function is switched off, i.e. t_ZW=0. It is apparent that after a commutation at instant H$_N$ (change in signal HALL), current i_M changes only slowly. In this case it therefore achieves only a low amplitude, i.e. motor M generates only a low output.

FIG. 23 again shows signal HALL at the bottom, and above it current i_M (FIG. 1), but with earlier commutation ("ignition advance"), i.e. current i_M is commutated earlier than the Hall change H$_N$ by a value equal to time t_ZW. It is clearly apparent that current i_M changes very rapidly immediately after commutation and reaches a substantially higher amplitude than in FIG. 22, i.e. in this case motor M generates a higher output and can therefore achieve a higher rotation speed. In FIG. 23, commutation occurs approximately 15° (elec.) before a change in signal HALL.

The table below shows typical examples of values of the components used: Capacitors:

| Capacitors: | |
| --- | --- |
| 135 | 1.5 nF |
| 127, 152 | 10 nF |
| 99, 110, 166, 167 | 33 nF |
| 154 | 100 nF |
| Tantalum capacitor 124 | 3.3 µF |
| Resistors: | |
| 140 | 3 ohms |
| 162, 163 | 47 ohms |
| 153, 155 | 1 kohms |
| 133, 136 | 2.2 kohms |
| 106 | 3.3 kohms |

-continued

| | |
|---|---|
| 164, 165 | 4.7 kohms |
| 123, 131, 132 | 10 kohms |
| 172, 173 | 22 kohms |
| 114, 126 | 33 kohms |
| 134 | 47 kohms |
| 101, 112, 128, 169 | 100 kohms |
| Npn transistor 150 | BC846 |
| Pnp transistor 168 | BC856B |
| Comparator 108, 120, 130 | LM2901D |
| Hall sensor 40 | HW101A |
| EEPROM 26 | AT24C01A two-wire serial CMOS EEPROM (ATMEL) |
| Microcontroller 11 | COP842CJ (Nat. Semicond.) |

The invention claimed is:

1. An electronically commutated motor comprising:
a stator, a rotor, and a program-controlled microprocessor, serving to control commutation of the motor;
said rotor rotating, during motor operation, through a plurality of commutation angular ranges, during each of which a commutation takes place as the rotor rotates therethrough, each commutation being preceded by:
  a) rotation of the rotor through a measuring angular range having a predefined angular relationship with a subsequent associated commutation angular range during which said commutation is to occur, during which measuring angular range data, relating to a time duration variable (t_H) needed by the rotor to rotate through said range, are ascertained;
  b) rotation of the rotor through a calculation range, during which a first time interval (t_TI) is calculated, based upon said time duration variable (t_H);
  c) a time measuring step, during which a time corresponding to said first time interval (t_TI) is measured, beginning at a predefined angular orientation of the rotor associated with said associated commutation angular range; and
  d) an interrupt routine, triggered upon conclusion of said time measuring step, said interrupt routine being operative to control, during said associated commutation angular range, time-advanced commutation, when said motor is operating in a steady state.

2. The motor according to claim 1, wherein
the motor control interrupt routine comprises program steps which prevent a commutation from being effected if the first time interval dependent on the ascertained time variable is greater than a time span presently required by the rotor to travel through a predefined angular distance.

3. The motor according to claim 2, further comprising:
an apparatus which triggers a rotor position-dependent interrupt routine at predefined rotor position.

4. The motor according to claim 3, wherein:
a timer, controllable by the rotor position-dependent interrupt routines, is provided, in order to ascertain said time variable (t_H).

5. The motor according to claim 4, wherein:
the timer is also configured to trigger said motor control interrupt routine.

6. The motor according to claim 5, wherein:
the timer is loadable, during a rotor position-dependent interrupt, with a first predefined count value which corresponds to the first time interval (t_TI) dependent on the ascertained time variable;
and which brings about a motor control interrupt after counting that first predefined count value.

7. The motor according to claim 3, wherein:
a rotor-position-dependent interrupt has a higher priority than a motor control interrupt.

8. The motor according to claim 4, wherein:
the timer, which in operation presents a timer value, is loadable, during a motor control interrupt, with a predefined count value;
and, subsequent to that loading operation, a count is performed until the next rotor position-dependent interrupt, so as to ascertain, by taking the difference between the predefined count value and the timer value upon reaching the next rotor position-dependent interrupt, a time offset between these interrupt operations.

9. The motor according to claim 8, further comprising:
an autoreload register for loading the predefined count value, which register stores the first predefined count value and feeds it to the timer during the motor control interrupt as the predefined count value.

10. A method of commutating an electronically commutated motor comprising a stator, a rotor and a program-controlled microprocessor serving to control commutation of said motor, comprising the steps of:
  a) ascertaining a rotation-speed-dependent value for a time variable (t_H) corresponding to a time interval required by the rotor to rotate through a predefined angular distance, said time variable being substantially inversely proportional to the rotation speed of the rotor;
  b) from that time variable (t_H), calculating, according to a predefined calculation rule, a numerical value (t_TI);
  c) measuring, beginning at a predefined first rotor position, a first time interval corresponding to that calculated numerical value;
  d) determining when said first time interval has elapsed, and thereafter triggering a commutation (TN);
  e) subsequent to the end of said first time interval, measuring a second time interval (t_1) until said rotor reaches a predefined second rotor position;
  f) adding the first and second time intervals to obtain, from their sum, a new rotation-speed-dependent value for the time variable (t_H) that is substantially inversely proportional to the rotation speed of the motor.

11. The method of claim 10, further comprising the step of:
correcting said sum by at least one correction factor.

12. The method according to claim 10, wherein:
said predefined calculation rule comprises
subtracting a predefined time from said time variable, which time variable is substantially inversely proportional to the rotation speed of the rotor.

13. The method according to claim 10, further comprising:
determining whether the first time interval corresponding to the calculated numerical value is greater than a time offset between the predefined first rotor position and the predefined second rotor position, and, if so, directly sensing the time offset between those two rotor positions and using the time offset as said time variable that is substantially inversely proportional to the rotation speed of the motor.

14. The method according to claim 10, further comprising:
comparing said time variable that is substantially inversely proportional to the rotation speed of the motor to a predefined value corresponding to a minimum rotation speed;

storing a logical value, corresponding to a result of said comparison result; and if that logical value has a predefined value, suppressing the triggering of a commutation that would otherwise be accomplished after the first time has elapsed.

15. The method according to claim 10, further comprising:

detecting when a predefined rotor position is reached, and executing a rotor position-dependent interrupt with an interrupt routine at the beginning of which a timer, providing time measurement, is stopped, and its instantaneous value is stored in a variable.

16. The method according to claim 15, further comprising:

in the rotor-position-dependent interrupt routine, stopping the timer providing time measurement, then loading the timer with a numerical value previously calculated in accordance with the predefined calculation rule, and thereafter restarting the timer.

17. The method according to claim 16, further comprising:

using the time span, between the stopping of the timer providing time measurement and the restarting thereof, as a correction factor during said step of ascertaining the time variable that is substantially inversely proportional to the rotation speed of the motor.

18. The method according to claim 10, further comprising the steps of:

ascertaining, beginning at a predefined rotor position, said rotation-speed-dependent value for said time variable which corresponds to a time interval required by the rotor to travel through a predefined angular distance, said time interval being substantially inversely proportional to the rotation speed of the rotor;

using said ascertained time variable in calculating said first time interval corresponding to the calculated numerical value, which is measured from said predefined first rotor position; and measuring said first time interval, corresponding to said calculated numerical value, beginning at said predefined rotor position that is reached again after a subsequent full rotor revolution.

19. The method according to claim 10, further comprising:

determining whether sufficient processor time is available for executing a predetermined non-time critical process step and, if so, executing a subroutine which performs said predetermined non-time-critical process step.

20. The method according to claim 19, further comprising:

calculating said rotation-speed-dependent value for said time variable that is substantially inversely proportional to the rotation speed of the motor, and calculating the numerical value on which measurement of the first time interval is based, as part of said subroutine executed when processor time is available.

21. The method according to claim 10, further comprising:

loading, from a nonvolatile memory associated with the motor, at least one parameter, necessary for calculations, into a random-access memory of the microprocessor.

22. The method according to claim 21, further comprising:

modifying, via a bus connection, at least one value stored in said nonvolatile memory.

23. An electronically commutated motor for operation with advanced commutation, comprising:

a stator, a rotor, a microprocessor adapted for executing a program which controls commutation of the motor, a timer, means for deriving a start value, for use in said timer, as a function of a rotation-dependent time interval which the rotor has required, in an associated time period preceding a just-completed commutation, to rotate through a predefined rotation angle, said start value being dependent on a time variable time that is substantially inversely proportional to the rotation speed of the motor at at least one predefined rotational position of said rotor;

means, responsive to said timer, for triggering an interrupt in said program of said microprocessor after elapse of a time interval having a duration dependent on the start value; and means for commutating said motor during said interrupt.

24. The motor according to claim 23, wherein said means for deriving further comprises:

means for subtracting a predefined time from the rotation-speed-dependent time interval as part of a calculation of the start value.

25. A method of determining a rotation-speed-dependent variable in an electronically commutated motor which includes:

a stator, a permanent-magnet rotor, a galvanomagnetic sensor controlled by that rotor, a microprocessor, a control program associated with that microprocessor, and a timer, comprising the steps of:

a) converting an output signal of the galvanomagnetic sensor into a substantially square-wave signal;

b) sensing, in the microprocessor, predefined signal changes of the square-wave signal and converting each signal change into a respective rotor-position-dependent interrupt;

c) at a rotor-position-dependent interrupt, recording a first counter status of the timer;

d) at a rotor position-dependent interrupt subsequent thereto, recording a second counter status of the timer;

e) calculating a difference between the two counter statuses and deriving, from said difference, a value which corresponds to a time interval required by the rotor to travel through a predefined rotation angle; and using said value as the rotation-speed-dependent variable.

26. An electronically commutated motor (M) comprising:

a stator and a rotor, a program-controlled microprocessor, adapted for controlling the commutation of the motor; and a rotor position sensor whose output signal is applied, for purposes of analysis by the microprocessor, to an interrupt-capable input of said microprocessor for processing therein;

said microprocessor furnishing, at at least one output of the microprocessor, a control signal, for commutation of the motor, that is shifted, with respect to the signal of the rotor position sensor, by a shift time, the duration of the shift time being a function of the rotation speed of said motor.

27. The electronically commutated motor according to claim 26, wherein the microcontroller comprises at least one interrupt-capable timer with which the at least one output of the microprocessor, serving to deliver the control signal, is influenced.

28. The electronically commutated motor according to claim 27, wherein:
the timer is, in a specified state, automatically reloaded with a value and restarted.

29. The electronically commutated motor according to claim 28, wherein:
the microprocessor triggers an interrupt at each change in the signal of the rotor position sensor; and wherein:
the timer and the interrupts are used to measure a value dependent on rotor speed.

30. The electronically commutated motor according to claim 27, wherein:
the microprocessor triggers an interrupt at each change in the signal of the rotor position sensor; and wherein:
the timer and the interrupts are used to measure a value dependent on rotor speed.

* * * * *